United States Patent
Tanoue et al.

(10) Patent No.: US 6,172,961 B1
(45) Date of Patent: Jan. 9, 2001

(54) OPTICAL RECORDING DISK HAVING LAND AND GROOVE CONTINUOUSLY ALTERNATED IN SPIRAL TRACKS

(75) Inventors: Koki Tanoue; Hideaki Osawa, both of Yokohama (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/084,496

(22) Filed: May 27, 1998

(30) Foreign Application Priority Data

May 27, 1997 (JP) .................................................. 9-136298

(51) Int. Cl.$^7$ ....................................................... G11B 7/24
(52) U.S. Cl. ......................................................... 369/275.4
(58) Field of Search .............................. 369/275.4, 275.3, 369/275.2, 47, 48, 58; 428/64.1, 64.4

(56) References Cited

U.S. PATENT DOCUMENTS

| | | |
|---|---|---|
| 5,422,874 | 6/1995 | Birukawa et al. . |
| 5,508,995 | 4/1996 | Moriya et al. . |
| 5,724,338 * | 3/1998 | Birukawa et al. ................. 369/275.2 |
| 5,754,506 * | 5/1998 | Nagasawa et al. ................ 369/275.4 |
| 5,848,050 * | 12/1998 | Nagasawa et al. ................ 369/275.4 |
| 5,867,474 * | 2/1999 | Nagasawa et al. ................ 369/275.3 |
| 5,872,767 * | 2/1999 | Nagai et al. ....................... 369/275.3 |
| 5,923,640 * | 7/1999 | Takemura et al. ................. 369/275.3 |
| 5,933,410 * | 8/1999 | Nakane et al. .................... 369/275.4 |
| 5,936,932 * | 8/1999 | Nakane et al. .................... 369/275.4 |
| 5,946,285 * | 8/1999 | Nakane et al. .................... 369/275.3 |

FOREIGN PATENT DOCUMENTS

| | | |
|---|---|---|
| 0 740 291 | 10/1996 | (EP) . |
| 0 759 609 | 2/1997 | (EP) . |
| 0 869 486 | 10/1998 | (EP) . |
| 97/50083 | 12/1997 | (WO) . |

* cited by examiner

Primary Examiner—Tan Dinh
(74) Attorney, Agent, or Firm—Pillsbury Madison & Sutro LLP

(57) ABSTRACT

A plurality of land sectors are arranged along a first spiral track, and at the header portion of the land sector directly before the first sector among the plural land sectors, information indicating that this sector is directly before the first sector with its address information, and a plurality of groove sectors are arranged along a second spiral track adjacent to the first spiral track, and at the header portion of the groove sector directly before the first sector among the plural groove sectors, information indicating that this sector is directly before the first sector with its address information, thereby forming a structure for switching the land sector and the groove sector successively and alternately every spiral track, with the header portions of the land sector and the groove sector making a pair to be arranged in a staggered pattern.

8 Claims, 8 Drawing Sheets

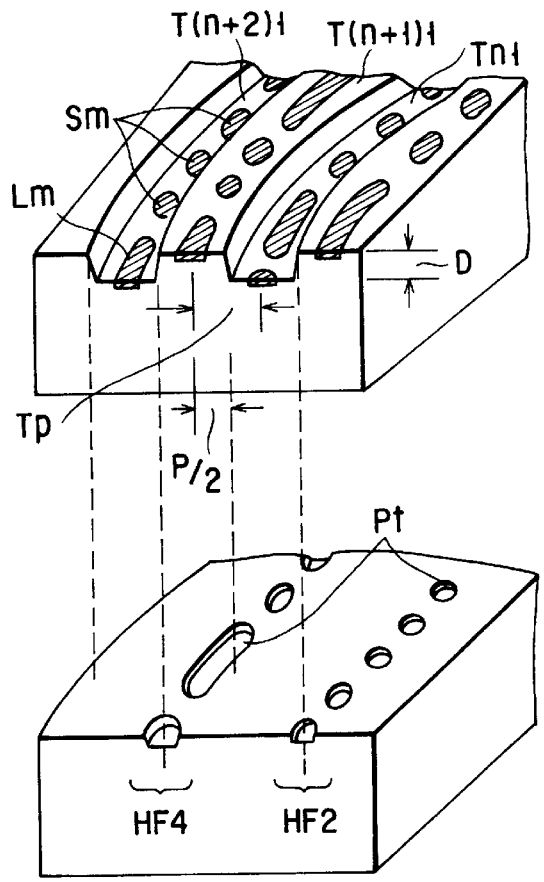
FIG. 3A
FIG. 3B
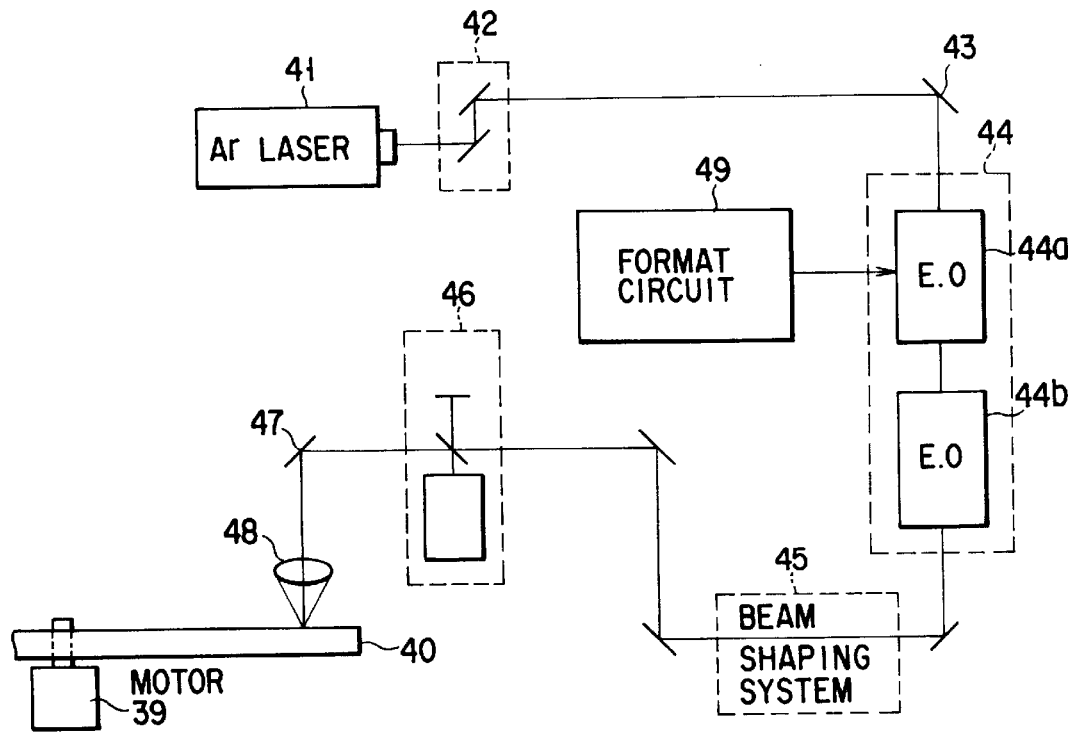
FIG. 5

FIG. 6A

| HEADER FIELD | MIRROR FIELD | GAP FIELD | GUARD 1 FIELD | VFO 3 FIELD | PS FIELD | DATA FIELD | PA3 FIELD | GUARD 2 FIELD | BUFFER FIELD |
|---|---|---|---|---|---|---|---|---|---|
| 128 | 2 | 10-J/16 | 20-K | 35 | 3 | 2418 | 1 | 55-K | 25-J/16 |
| | | | | | | RECORDING FIELD | | | |

| HEADER 1 FIELD | | | | | HEADER 2 FIELD | | | | | HEADER 3 FIELD | | | | | HEADER 4 FIELD | | | | |
|---|---|---|---|---|---|---|---|---|---|---|---|---|---|---|---|---|---|---|---|
| VFO1 | AM | PID 1 | IED 1 | PA1 | VFO2 | AM | PID 2 | IED 2 | PA2 | VFO1 | AM | PID 3 | IED 3 | PA1 | VFO2 | AM | PID 4 | IED 4 | PA2 |
| 36 | 3 | 4 | 2 | 1 | 8 | 3 | 4 | 2 | 1 | 36 | 3 | 4 | 2 | 1 | 8 | 3 | 4 | 2 | 1 |

| ZONE | NUMBER OF SECTORS PER REVOLUTION | START SECTOR NUMBER (HEX VALUE) | BUFFER AREA (INNER SIDE) SECTOR NUMBER (HEX VALUE) | GROUP NUMBER | GROUP USER AREA SECTOR NUMBER (HEX VALUE) | GROUP USER AREA NUMBER OF BLOCKS | GROUP SPARE AREA SECTOR NUMBER (HEX VALUE) | GROUP SPARE AREA NUMBER OF SECTORS | BUFFER AREA (OUTER SIDE) SECTOR NUMBER (HEX VALUE) | END SECTOR NUMBER (HEX VALUE) | LBA OF START SECTOR IN THE GROUP | DATA FIELD NUMBER OF START SECTOR IN THE GROUP (HEX VALUE) |
|---|---|---|---|---|---|---|---|---|---|---|---|---|
| Z 0 | 17 | 31000 | — | 0 | 31000-377DF | 1662 | 377E0-37D2F | 1360 | 37D30-37D5F | 37D5F | 0 | 31000 |
| Z 1 | 18 | 37D60 | 37D60-37D8F | 1 | 37D90-3FB2F | 2010 | 3FB30-401EF | 1728 | 401F0-4021F | 4021F | 26592 | 377E0 |
| Z 2 | 19 | 40220 | 40220-4024F | 2 | 40250-486EF | 2122 | 486F0-48E0F | 1824 | 48E10-48E3F | 48E3F | 58752 | 3F580 |
| Z 3 | 20 | 48E40 | 48E40-48E6F | 3 | 48E70-51A0F | 2234 | 51A10-5218F | 1920 | 52190-521BF | 521BF | 92704 | 47A20 |
| Z 4 | 21 | 521C0 | 521C0-521EF | 4 | 521F0-5B48F | 2346 | 5B490-5BC6F | 2016 | 5BC70-5BC9F | 5BC9F | 128448 | 505C0 |
| Z 5 | 22 | 5BCA0 | 5BCA0-5BCCF | 5 | 5BCD0-6566F | 2458 | 65670-65EAF | 2112 | 65EB0-65EDF | 65EDF | 165984 | 59860 |
| Z 6 | 23 | 65EE0 | 65EE0-65F0F | 6 | 65F10-6FFAF | 2570 | 6FFB0-7084F | 2208 | 70850-7087F | 7087F | 205312 | 63200 |
| Z 7 | 24 | 70880 | 70880-708AF | 7 | 708B0-7B04F | 2682 | 7B050-7B94F | 2304 | 7B950-7B97F | 7B97F | 246432 | 6D2A0 |
| Z 8 | 25 | 7B980 | 7B980-7B9BF | 8 | 7B9C0-8683F | 2792 | 86840-8719F | 2400 | 871A0-871DF | 871DF | 289344 | 77A40 |
| Z 9 | 26 | 871E0 | 871E0-8721F | 9 | 87220-9279F | 2904 | 927A0-9315F | 2496 | 93160-9319F | 9319F | 334016 | 828C0 |
| Z 10 | 27 | 931A0 | 931A0-931DF | 10 | 931E0-9EE5F | 3016 | 9EE60-9F87F | 2592 | 9F880-9F8BF | 9F8BF | 380480 | 8DE40 |
| Z 11 | 28 | 9F8C0 | 9F8C0-9F8FF | 11 | 9F900-ABC7F | 3128 | ABC80-AC6FF | 2688 | AC700-AC73F | AC73F | 428736 | 99AC0 |
| Z 12 | 29 | AC740 | AC740-AC77F | 12 | AC780-B91FF | 3240 | B9200-B9CDF | 2784 | B9CE0-B9D1F | B9D1F | 478784 | A5E40 |
| Z 13 | 30 | B9D20 | B9D20-B9D5F | 13 | B9D60-C6EDF | 3352 | C6EE0-C7A1F | 2880 | C7A20-C7A5F | C7A5F | 530624 | B28C0 |
| Z 14 | 31 | C7A60 | C7A60-C7A9F | 14 | C7AA0-D531F | 3464 | D5320-D5EBF | 2976 | D5EC0-D5EFF | D5EFF | 584256 | BFA40 |
| Z 15 | 32 | D5F00 | D5F00-D5F3F | 15 | D5F40-E3EBF | 3576 | E3EC0-E4ABF | 3072 | E4AC0-E4AFF | E4AFF | 639680 | CD2C0 |
| Z 16 | 33 | E4B00 | E4B00-E4B4F | 16 | E4B50-F31AF | 3686 | F31B0-F3E0F | 3168 | F3E10-F3E5F | F3E5F | 696896 | DB240 |
| Z 17 | 34 | F3E60 | F3E60-F3EAF | 17 | F3EB0-102C0F | 3798 | 102C10-1038CF | 3264 | 1038D0-10391F | 10391F | 755872 | E98A0 |
| Z 18 | 35 | 103920 | 103920-10396F | 18 | 103970-112DCF | 3910 | 112DD0-113AEF | 3360 | 113AF0-113B3F | 113B3F | 816640 | F8600 |
| Z 19 | 36 | 113B40 | 113B40-113B8F | 19 | 113B90-1236EF | 4022 | 1236F0-12446F | 3456 | 124470-1244BF | 1244BF | 879200 | 107A60 |
| Z 20 | 37 | 1244C0 | 1244C0-12450F | 20 | 124510-13476F | 4134 | 134770-13554F | 3552 | 135550-13559F | 13559F | 943552 | 1175C0 |
| Z 21 | 38 | 1355A0 | 1355A0-1355EF | 21 | 1355F0-145F4F | 4246 | 145F50-146D8F | 3648 | 146D90-146DDF | 146DDF | 1009696 | 127820 |
| Z 22 | 39 | 146DE0 | 146DE0-146E2F | 22 | 146E30-157E8F | 4358 | 157E90-158D2F | 3744 | 158D30-158D7F | 158D7F | 1077632 | 138180 |
| Z 23 | 40 | 158D80 | 158D80-158DCF | 23 | 158DD0-16A57F | 4475 | 16A580-16B47F | 3840 | — | 16B47F | 1147360 | 1491E0 |
| TOTAL | | | | | | 76185 | | 65392 | | | | |

FIG. 10

OPTICAL RECORDING DISK HAVING LAND AND GROOVE CONTINUOUSLY ALTERNATED IN SPIRAL TRACKS

BACKGROUND OF THE INVENTION

The present invention relates to an information recording/reproducing optical disk for recording/reproducing information on/from a sector arranged along a spiral track as an information unit, and an information recording/reproducing device using this disk.

A commercially available, rewritable optical disk for recording/reproducing information includes a magneto-optical disk having 120 or 90 mm in diameter and a phase transition disk (PD) having 120 mm in diameter.

On these disks, a guide groove for guiding a laser beam radiation is formed. Diffraction of the laser beam by the guide groove is used to carry out tracking. This guide groove is formed in a continuous spiral form from the inner peripheral portion of the disk toward the outer peripheral portion thereof. The guide groove is simply called a "groove" and the portion which is not the guide groove is called a "land". In the prior optical disk, information is recorded on either one of the groove or land.

Information on such an optical disk is read and recorded, for example, by unit of 512 bytes or 2048 bytes. The information unit of a group of such bytes is called a "sector". Sector addresses which indicate respective addresses of the sectors are assigned to the sectors, respectively. In order to record information on a target address and reproduce the information with high reliability, the sectors are formatted in accordance with a specified sector format. In formatting, information on the sector address is recorded by forming a recess called a pit at the head of each of the sectors. The section at which the sector address information is recorded is called a "header". As described above, in the prior optical disk, information is recorded on either one of the groove or the land (i.e., groove recording or land recording). As a result, the header is also arranged at only the groove in the case of the groove recording, and at only the land in the case of the land recording.

If information is recorded on both of the land and the groove, which is different from the prior optical disk, it can be easily expected that more recording capacity can be realized.

However, a subject for making it possible to record information on both the land and groove is a method for forming sector addresses. Details thereof will be described below.

In the above-described prior optical disk on which the spiral groove is formed, the groove and the land are formed in parallel. The groove and the land are spiral tracks which can be traced in parallel. In other words, a spiral track of each of the groove and the land is formed on the disk. Thus, the structure of the prior optical disk is referred to as a "double spiral structure".

Since the groove and the land are formed in parallel in the double spiral structure, track jump is indispensable in shift from the groove to the land. Therefore, when recording/reproducing information on/from the groove is switched to recording/reproducing information on/from the land or vice versa, track jump or seeking is necessary so that successive record or reproduction of the information is difficult.

In order to format a disk having this double spiral structure, there is only a method of formatting sectors on the groove (called "groove sectors" hereinafter) and sectors on the land (called "land sectors" hereinafter) separately. This results in an inconvenience, for example when the disk is formatted so as to record/reproduce information alternately, in a zone CAV manner, on/from the groove and land which are adjacent to each other.

Specifically, in order that the adjacent land and groove have successive sector addresses, it is necessary to format only the groove and format only the land, while assigning intermittent addresses every track cycle. In this case, difficult is the formatting for performing position-matching accurately at the connecting points where addresses are successive from the land to the groove or vice versa. If, in recording/reproducing information, the shift from the land to the groove or from the groove to the land is not smoothly performed, the wait for rotation of the disk is unavoidable so that continuous record/reproduction of the information is obstructed.

In order to overcome these problems, an object of the present invention is to provide an information recording/reproducing optical disk having large recording capacity and a high speed access and making it possible to record and reproduce successive information with high reliability.

Another object of the present invention is to provide an information recording/reproducing device for precisely recording/reproducing information on/from such an optical disk at a high speed.

BRIEF SUMMARY OF THE INVENTION

To accomplish the objects, an information recording/reproducing optical disk and an information recording/reproducing device according to the present invention has a structure as follows.

The information recording/reproducing optical disk comprises:
  a predetermined number of land sectors arranged along one spiral track, each land sector comprising a first recording portion which is an area having a land shape in which data are recorded/reproduced and which is arranged on the spiral track, and a first-half header portion arranged before the first recording portion, for indicating information on an address of data to be recorded/reproduced on/from the first recording portion and information on a relative location of the first recording portion in the one spiral track; and
  a predetermined number of groove sectors arranged along one spiral track, each groove sector comprising a second recording portion which is an area having a groove shape in which data are recorded/reproduced and which is arranged on the spiral track, and a second-half header portion arranged before the second recording portion, for indicating information on an address of data to be recorded/reproduced on/from the second recording portion and information on a relative location of the second recording portion along one spiral track,
  the second-half header portion and the first-half header portion making a pair to be arranged in a staggered pattern,
  a plurality of the groove sectors being arranged along one spiral track in succession to the plural land sectors arranged along one spiral track;
  wherein the land sectors are arranged along one spiral track in succession to the plural groove sectors arranged along another spiral track, thereby performing the switch between the land sector and the groove sector alternately and successively in units of spiral tracks.

The location information on a relative location of the first recording portion in one spiral track is location information recorded, together with the address information, at the first-half header portion of the land sector arranged at the position for the switch to the groove sector among the plural land sectors arranged along one spiral track, and is the first location information indicating that the land sector is a first land sector directly before the groove sector.

The location information on a relative location of the second recording portion in one spiral track is location information recorded, together with the address information, at the second-half header portion of the groove sector arranged at the position for the switch to the land sector among the plural groove sectors arranged along one spiral track, and is the second location information indicating that the groove sector is a groove sector directly before the land sector.

The location information on a relative location of the first recording portion in one spiral track is location information recorded, together with the address information, at the first-half header portion of the second land sector arranged directly before the first land sector among the plural land sectors arranged along one spiral track, and is the third location information indicating that the second land sector is a land sector directly before the first land sector.

The location information on a relative location of the second recording portion in one spiral track is location information recorded, together with the address information, at the second-half header portion of the second groove sector arranged directly before the first groove sector among the plural groove sectors arranged along one spiral track, and is the fourth location information indicating that the second groove sector is a groove sector directly before the first groove sector.

The location information recording/reproducing device using an optical disk device according to the present invention is an optical disk device for irradiating an optical disk with a light beam along its spiral track to record/reproduce data by optical property change, comprising:

a light radiating means for radiating the light beam onto the optical disk, a light detecting means for detecting optical property change in reflective light reflected from the optical disk by radiating the light beam with the light radiating means, and a position controlling means for controlling a position irradiated with the light beam so as to radiate the light beam onto a desired position along the spiral track on the basis of the optical property change in the reflected light detected with the light detecting means;

the optical disk comprising:

a land sector comprising a first recording portion which is an area having a land shape in which data are recorded/reproduced and which is arranged on a spiral track, and a first-half header portion arranged before the first recording portion, for indicating information on an address of data to be recorded/reproduced on/from the first recording portion and information on a relative location of the first recording portion in one spiral track, a plurality of the land sectors being arranged along one spiral track; and a groove sector comprising a second recording portion which is an area having a groove shape in which data are recorded/reproduced and which is arranged on the spiral track, and a second-half header portion arranged before the second recording portion, for indicating information on an address of data to be recorded/reproduced on/from the second recording portion and information on a relative location of the second recording portion in one spiral track, the second-half header portion and the first-half header portion making a pair to be arranged in a staggered pattern, a plurality of the groove sectors being arranged along one spiral track in succession to the plural land sectors arranged along one spiral track;

wherein the land sectors are arranged along one spiral track in succession to the plural groove sectors arranged along one spiral track, thereby performing the switch between the land sector and the groove sector alternately and successively in units of the spiral tracks; and the first location information in the first-half header portion and the second location information in the second-half header portion in the optical disk being reproduced to give a decision for the switch between the land sector and the groove sector, thereby performing the switch between position-control for irradiating the land sector with the light beam and position-control for irradiating the groove sector with the light beam.

The information on a relative location of the first recording portion in one spiral track is location information recorded, together with the address information, at the first-half header portion of the land sector arranged at the position for the switch to the groove sector among the plural land sectors arranged along one spiral track, and is the first location information indicating that the land sector is a land sector directly before the groove sector. The information on a relative location of the second recording portion in one spiral track is location information recorded, together with the address information, at the second-half header portion of the groove sector arranged at the position for the switch to the land sector among the plural groove sectors arranged along one spiral track, and is the second location information indicating that the groove sector is a groove sector directly before the land sector.

The location information on a relative location of the first recording portion in one spiral track is location information recorded, together with the address information, at the first-half header portion of the second land sector arranged directly before the first land sector among the plural land sectors arranged along one spiral track, and is the third location information indicating that the second land sector is a land sector directly before the first land sector.

The location information on a relative location of the second recording portion in one spiral track is location information recorded, together with the address information, at the first-half header portion of the second groove sector arranged directly before the first groove sector among the plural groove sectors arranged along one spiral track, and is the fourth location information indicating that the second groove sector is a groove sector directly before the first groove sector.

The information recording/reproducing optical disk and the optical disk device according to the present invention have the structures described above. Thus, information can be recorded with high density, since the information can be recorded on the land and the groove.

As described above, the location information recorded on the header portions arranged in the staggered pattern is read so as to make it possible to recognize the relative locations of the first and second recording portions arranged in succession to the read header portion in one spiral track. This makes it possible to give a decision for the position of the switch between the plural land sectors and groove sectors arranged alternately in units of the spiral tracks.

From the first location information to the fourth location information are recorded in the header portions arranged before the switching positions. Therefore, it is possible to recognize the switching positions beforehand and then switch the tracking polarity and the tracking of the desired lands and the grooves more reliably.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B are enlarged perspective views of a recording portion having lands and grooves, and a header portion having pits, respectively.

FIG. 5 is a block diagram for showing a master recording apparatus for recording convex and concave shapes corresponding to grooves and pits on a master by cutting, in the process for manufacturing an information recording/reproducing optical disk according to the embodiment of the invention.

FIGS. 6A and 6B are views for showing the whole structure of the sector in an information recording/reproducing optical disk according to an embodiment of the invention, and for the header portion of this sector more specifically, respectively.

FIG. 10 is a view showing information on various factors of the respective zones of the optical disk illustrated in FIG. 9 and numbers representing the factors, in a table style.

DETAILED DESCRIPTION OF THE INVENTION

The embodiment of the present invention will be described below with reference to the accompanying drawings.

Figure 1:
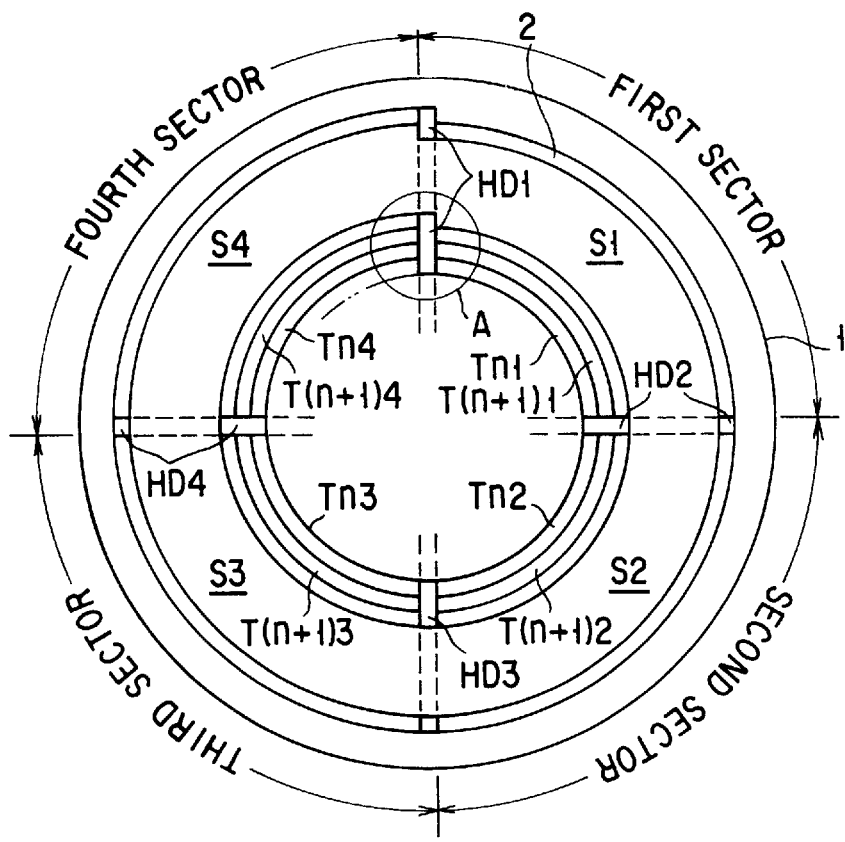
FIG. 1 is a schematic view of a track format of an information recording/reproducing optical disk according to the present invention.

FIG. 1 is a schematic view showing a track format of an information recording/reproduction optical disk 1 according to one embodiment of the present invention.

The optical disk 1 has a spiral track 2 which is divided into a plurality of (four, in this case) sector regions S1 to S4. Sector tracks included in each sector region are provided with header regions HD1 to HD4 each including a header structure as will be described in detail later.

The track 2 includes a plurality of land tracks and groove tracks. Each land track is arranged along one spiral track and each groove track is arranged along one spiral track. The land tracks and the groove tracks are connected at the header region HD1 so that the land tracks and groove tracks are alternately arranged on the optical disk 1 from the inner peripheral side to the outer peripheral side thereof to form the single track 2.

In FIG. 1, a projected band shaped portion is referred to as the land track portion and a recessed band shaped portion is referred to as the groove 9 portion. When the optical disk 1 is used to record/reproduce information to/from the optical disk 1, a light beam is applied from the back side of the drawing. Therefore, the land track is seen as a groove track and the groove track is seen as a land track from the view point of the light beam application.

In FIG. 1, a groove track Tn1 of an n-th sector included in the first sector region S1 is connected to a groove track Tn2 via a header portion of the header region HD2 in the second sector region S2 and then connected to a groove track Tn3 via the header portion of the header region HD3 in the third sector region S3 and at last is connected to a groove track Tn4 via a header portion of the header region HD4 in the fourth sector region S4.

The groove track Tn4 is connected to a (n+1)-th land track T(n+1)1 via a header portion of the header region HD1 in the first sector region S1 and in the similar way, to land tracks T(n+1)2, T(n+1)3, T(n+1)4, respectively in sequence, via header portions of the header regions HD2 to HD4.

Figure 2:
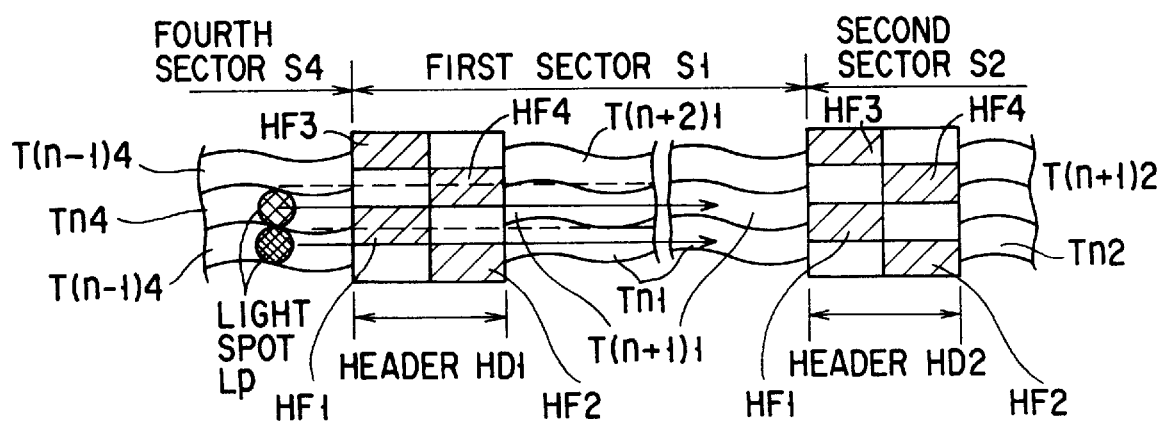
FIG. 2 is an enlarged view of the header portion inside the circle shown by A in FIG. 1.

The connection between the land tracks and the groove tracks at the header region HD1 enclosed in an circle A shown in FIG. 1 will be described in detail by referring to FIG. 2. In FIG. 2, track headers HF1 and HF2 are provided for connecting a land track T(n−1)4 and a groove track Tn1 in the header region HD1 of the first sector region S1. The track header HF1 is formed in a track position displaced from the track position of the land track T(n−4)4 by a distance ½ a track width pitch outward in a radial direction of the optical disk 1, while the track header HF2 is displaced from the track position of the groove track Tn1 by a distance ½ a width pitch inward in the radial direction of the disk 1. Accordingly, the track headers HF1 and HF2 are displaced with each other by the width pitch of the groove track Tn1 in the radial direction of the disk 1 so that the headers HF1 and HF2 are arranged in a so-called staggered fashion with each other.

In the header region HD2, the relative positional relationships among the headers HF1, HF2 and the groove tracks Tn1, Tn2 are the same as those in the header region HD1. The n-th groove track Tn1 is connected to the groove track Tn2 via the staggered track headers HF1 and HF2 of the header region HD2 in the second sector region S2. As has been described by referring to FIG. 1, the groove track Tn2 is connected to the groove tracks Tn3 and Tn4 in sequence and the groove track Tn4 of the fourth sector region S4 is connected to the next track header HF1 of the next land track T(n+1)1 in the header region HD1. Thus, the track header HF1 is commonly connected to the two tracks T(n−1)4 and Tn4 in a manner displaced by the distance ½ the track pitch of the respective tracks T(n−1)4 and Tn4 as will be described in detail later.

The track header HF1 is connected to the track header HF4 staggered with the track header HF1 in a manner displaced by a track pitch from the track header HF1. To the track header HF4 is connected a land track T(n+1)1 in a manner displaced from the track of the header HF4 by ½ the track pitch inward in the radial direction of the disk 1. The land track T(n+1)1is connected to a land track T(n+1)2 via the staggered track headers HF1 and HF4. In the similar manner, a land track T(n+1)4 is connected to the track header HF3 in the header region HD1 displaced from the track of the header HF3 by ½ the track pitch inward direction of the disk 1.

This track header HF3 is displaced from the track header HF4 by the track pitch P in the outward direction to arrange the track headers HF1 to HF4 in a staggered fashion. The track header HF4 is connected connected to a groove track T(n+2)1 displaced from the header HF4 by ½ the track pitch in the outward direction of the disk 1.

The land track T(n−1)4 is connected to the groove track Tn1, the groove track Tn4 to the land track T(n+1)1, and the land track T(n+1)4 to the groove track T(n+2)1 via the headers in the header region HD1. Whereas, in the remaining header regions HD2 to HD4, the land tracks are connected to the land tracks and the groove tracks are connected to the groove tracks. Accordingly, when the groove tracks are arranged along one spiral track, the last groove track is connected to a first one of the land tracks, and the land tracks arranged along one spiral track are followed by the next groove tracks, thereby forming one spiral track from inner peripheral side to the outer peripheral side of the optical disk 1.

When information is being recorded/reproduced on/from the optical disk 1, a laser light spot Lp is scanned by an arrow as shown in FIG. 2. The light spot Lp having a diameter substantially equal to the track width, for example, is scanned along the land track T(n−)4 and enters into the header region HD1. In this header region HD1, the outer half portion of the light spot Lp is first scans the inner half portion of the first header portion HF1 and then the outer half of the second header portion HF2 is scanned by the inner half referring to FIGS. 3A and 3B.

FIG. 3A is a perspective view for showing a part of information recording portion of the groove track Tn1, land track T(n+1)1 and groove track T(n+2)1 connected to the headers in the header region HD1. Hatched portions are the phase change recording marks including short marks Sm and long marks Lm which are combined in accordance with the contents of the information being recorded. In this embodiment, the depth D of the respective groove tracks is set as ⅙ the wavelength of the laser light. The wavelength is set as 680 nm and the track pitch Tp is set in the range of 0.65 to 0.80 micron. The diameter of the light spot Lp is set about 0.95 micron. The diameter of the width of the pit Pt is set in the order of 0.7 micron in FIGS. 3A and 3B.

FIG. 3B is a perspective view showing a part of the track headers HF2 and HF4 connected to the groove track Tn1, land track T(n+1)1 and groove track T(n+2)1 in the header region HD1. As has been described above, the header region HD1 has no land/groove structure unlike the track portions. In the flat surface of the header region a plurality of recesses or pits Pt are arranged in the direction of the tracks as shown in FIG. 3B. The dashed lines connecting the boundary portions of the land and groove tracks shown in FIG. 3A and the center of the pits Pt shown in FIG. 3B show the part of the light spot Lp. When the light spot Lp enters from the groove track Tn4 to the header region HD1, the light spot Lp scans the outer half part of the first header portion HF1 and then the inner half part of the fourth header portion HF4 and enters into the land track T(n+1)1. Address information to be recorded in the tracks in the first sector region S1 is recorded in the header portions HF1 to HF4 in advance and reproduced when the header portions HF1 to HF4 are scanned by the light spot Lp in the described manner. Recording/reproduction of the address information will be described in detail later.

The track portions used to record/reproduce information is formed by the alternately arranged land tracks and groove tracks wherein the information is recorded in the form of a phase change recording mark in the present embodiment. However, a rewritable optical disk allowing information recording/reproduction also can be realized as a magneto-optical disk, according to the present invention.

The header regions HD1 to HD4 have a structure wherein recesses called as pits are formed on a flat surface of the header forming area of the optical disk 1. The structure of the land tracks and groove tracks formed with phase change recording marks and the header portions formed with pits will be described by fact that the header portions HF2 and HF4 are displaced from the land and groove tracks by a distance ½ the track pitch P. The depth of the pits Pt is set in the order of ¼ a wavelength of the laser light.

Figure 4A:
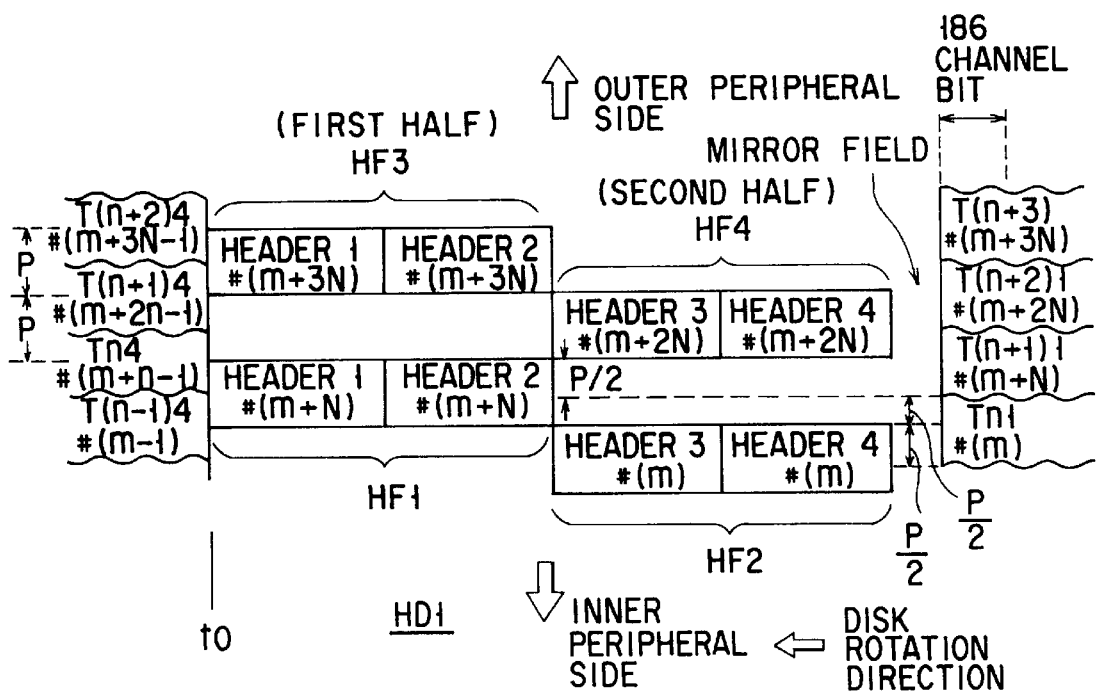
FIGS. 4A and 4B are more specific views for showing the structure of the header portions in the sectors of the information recording/reproducing optical disk according to the embodiment of the invention illustrated in FIG. 2, respectively.
Figure 4B:
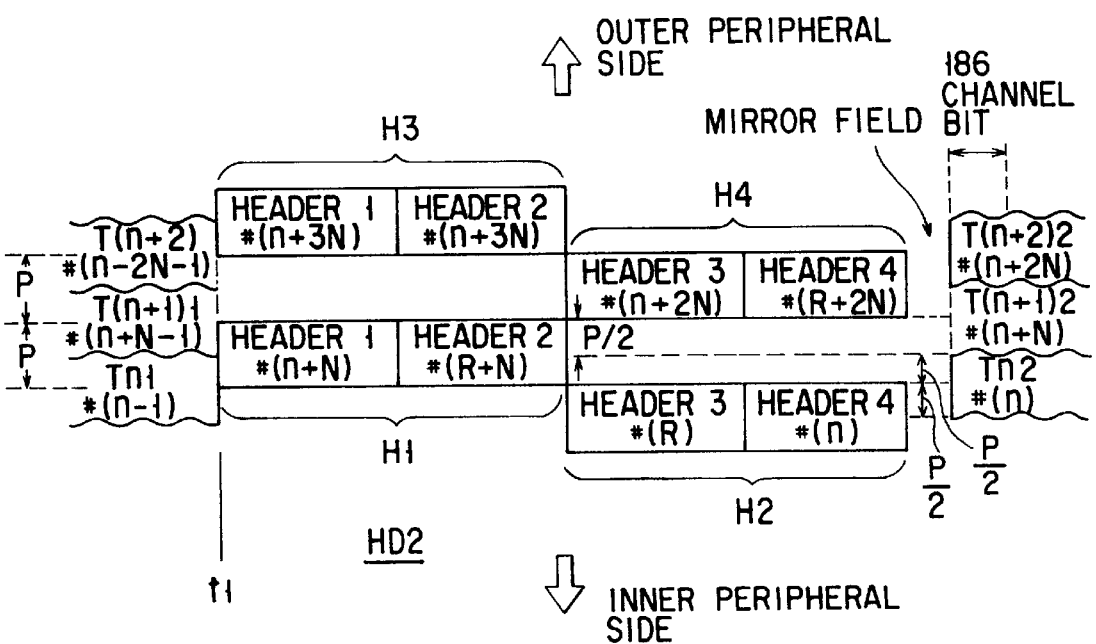

FIGS. 4A and 4B schematically show the arrangement of header portions HF1 to HF4 of the header region HD1 in the sector region S1 of an information recording/reproducing optical disk 1 shown in FIGS. 1 to 3B. In the optical disk 1 having the header portion structure shown in FIG. 1, when the track 2 is spirally traced, the polarity of tracking is alternated at the header region HD1 in units of one spiral track between the land and groove without any track jump. This structure will be described below.

FIG. 4A shows the arrangement of the header portions of the first sector S1 at the tracking polarity switching portion, namely, at the header region HD1 as shown in FIG. 2. The sector at the tracking polarity switching portion will be called first sector S1. FIG. 4B shows the arrangement of the header portions HD2 to HD4 of sectors S2 to S4 other than the first sector S1. In the above-described scheme of alternating the groove and land in units of tracks, the polarity representing the groove or land must be switched in tracking, and the correspondence between the tracks and header portions at the tracking polarity switching sector S1 is different from that of the remaining sectors S2 to S4.

In FIG. 4A, each of track headers HF1 and HF3 is provided with serially arranged header portions header-1 and header-2 and each of track headers HF2 and HF4 is provided with serially arranged header portions header-3 and header-4 to form the first header region HD1. The header region HD1 is an area formed by a recessed pattern called pits Pt as shown in FIG. 3B. Address information associated with the first sector S1 is recorded by this pits Pt.

Tracks Tn1, T(n+1)1, T(n+2)1 and T(n+3)1 are information recording areas included in the sector region S1, and tracks T(n−1)4, Tn4, T(n+1)4 and T(n+2)4 are information recording areas included in the fourth sector S4. These information recording areas are formed from, e.g., a phase change recording film and will be referred to as recording portions hereinafter. In the phase change recording film, the user records/reproduces information using the difference in reflectance between the crystalline state and amorphous state of the recording film due to a change in optical characteristics.

The tracks Tn2, T(n+1)2 and T(n+2)2 in the second sector region S2 shown in FIG. 4B are also information recording regions of the phase change type recording films.

Of the recording tracks, tracks Tn1, T(n+2)1, Tn4 and T(n+2)2 are groove tracks and the tracks Tn2, T(n+2)2 in FIG. 4B are also groove tracks. These track regions will be referred to as a recording portion in a groove sector.

On the other hand, tracks T(n+1)1, T(n+3)1, T(n−1)4 and T(n+1)4 are recording portions of sectors which are adjacent to the groove sectors and formed at portions other than the guide grooves, and will be referred to as recording portions of land sectors hereinafter.

In FIGS. 4A and 4B, the upper side of the drawing corresponds to the outer peripheral portion of the disk 1, and the lower side corresponds to the inner peripheral portion of the disk 1. Therefore, the vertical direction in FIGS. 4A and 4B corresponds to the radial direction of the disk 1.

In addition, reference characters #(m), #(m+N), #(m+2N), #(m+3N) and #(n), #(n+N), #(n+2N), #(n+3N) shown in FIGS. 4A and 4B are sector numbers representing sector addresses. In this case, m and n are integers, N is the number of sectors per one spiral track and a predetermined integer from, e.g., 17 to 40.

The header structure shown in FIG. 4A will be described below. FIG. 4A shows the header region HD1 in the first sector S1 corresponding to four tracks with sector numbers #m, #(m+N), #(m+2N), and #(m+3N). The header portions of this first header region HD1 are formed to have a quadruple write structure by cutting operations (to be described later). The header portions having the quadruple write structure are those header-1, header-2, header-3, and header-4.

Header portions header-1 and header-2 constitute first and third header portions HF1 and HF3 of the first-half header portion, and header-3 and header-4 constitute second and fourth header portions of a second-half header portion. The first-half header portion is used as the land sector header portion, and the second-half header portion is used as the groove sector header portion.

More specifically, in the recording portion Tn1 of groove sector #(m) whose address is represented by sector number #(m), a second-half header portion HF2 formed at the start portion via a mirror field (to be referred to as a mirror portion hereinafter) is used as the header portion of the sector. No information is recorded/reproduced to/from this mirror portion.

The second-half header portion HF2 is constituted by header portions header-3 and header-4 on which the address information of sector number #(m) is recorded.

The second-half header portion HF2 is formed at a position displaced inward from the position of the recording track Tn1 of groove sector #(m) by ½ the track pitch. The track pitch is the distance from the center of a land to the center of a groove adjacent to the land and corresponds to a distance P shown in FIGS. 4A and 4B.

For the recording track T(n+1)1 of land sector #(m+N) whose address information is represented by sector number #(m+N), a first-half header portion HF1 formed at the start portion via the mirror portion and the area occupied by the above-described second-half header portion HF2 is used as the header portion of the sector. The first-half header portion HF1 is constituted by the header portions header-1 and header-2 on which address information of sector number #(m+N) is recorded. More specifically, the first-half header portion HF1 represents address information different from that represented by the second-half header portion HF2 by one track, i.e., the first-half header portion HF1 represents address information different from that of the second-half header portion HF2 on an outside track. In addition, the first-half header portion HF1 is formed at a position shifted inward from the position of the recording portion T(n+1)1 of land sector #(m+N) by ½ the track pitch.

The recording portion T(n+1)1 of land sector #(m+N) is formed adjacent to the recording portion Tn1 of groove sector #(m). More specifically, the recording portion T(n+1)1 of land sector #(m+N) is formed at a position shifted outward from the recording portion Tn1 of groove sector #(m) by one track pitch. That is, the first-half header portion HF1 is formed at a position shifted outward from the second-half header portion HF2 by one track pitch. The first-half header portion HF1 and second-half header portion HF2 are continuously formed by cutting (to be described later), and header-2 of the first-half header portion HF1 and header-3 of the second-half header portion HF2 are close to each other. With this arrangement, the first-half header portion HF1 and second-half header portion HF2 are paired to have a staggered header structure.

The recording portion T(n−1)4 of land sector #(m−1) whose address information is represented by a sector number immediately preceding to sector number #(m) of the recording portion Tn1 of groove sector #(m) is formed on the same track as that of the recording portion Tn1 of groove sector #(m) via the area occupied by the first-half header portion HF1 which is formed between the recording portion T(N−1)4 and the start portion of the second-half header portion HF2 as the header portion of groove sector #(m), i.e., header-3. Similarly, the recording portion Tn4 of groove sector #(m+N−1) whose address information is represented by a sector number immediately preceding to sector number #(m+N) of the recording portion T(n+1)1 of land sector #(m+N) is formed on the same track as that of the recording portion RF2T(n+1)1 of land sector #(m+N) to be close to the start portion of the first-half header portion HF1 as the header portion of land sector #(m+N), i.e., header-1.

The header structure shown in FIG. 4B will be described next. In FIG. 4B, sectors corresponding to three tracks with sector numbers #n, #(n+N), and #(n+2N) are shown. The header portions of these sectors are formed to have a quadruple write structure by cutting (to be described later), as in the above-described first sectors. The header portions having the quadruple write structure will be referred to as header-1, header-2, header-3, and header-4, as in the first sectors. Header-1 and header-2 constitute first-half header portions H1 and H3 used as the header portion of the land sector, and header-3 and header-4 constitute second-half header portions H2 and H4 used as the header portion of the groove sector.

More specifically, for the recording portion Tn2 of groove sector #(n) whose address is represented by sector number #(n), a second-half header portion H2 formed at the start portion via a mirror portion is used as the header portion of the sector. The second-half header portion H2 is constituted by header-3 and header-4 on which the address information of sector number #(n) is recorded. The second-half header portion H2 is formed at a position displaced inward from the position of the recording portion Tn2 of groove sector #(n) by ½ the track pitch.

For the recording portion T(n+1)2 of land sector #(n+N) whose address information is represented by sector number #(n+N), a first-half header portion H1 formed at the start portion via the mirror portion and the area occupied by the above-described second-half header portion H2 is used as the header portion of the sector. The first-half header portion H1 is constituted by header-1 and header-2 in which the address information of sector number #(n+N) is recorded. The first-half header portion H1 is formed at a position displaced inward from the position of the recording portion T(n+1)2 of land sector #(n+N) by ½ the track pitch.

The recording portion T(n+1)2 of land sector #(n+N) is formed adjacent to the recording portion Tn2 of groove sector #(n). More specifically, the recording portion T(n+1)2 of land sector #(n+N) is formed at a position displaced outward from the recording portion Tn2 of groove sector #(n) by one track pitch. That is, the first-half header portion H1 is formed at a position displaced outward from the second-half header portion H2 by one track pitch. The first-half header portion H1 and second-half header portion H2 are continuously formed by cutting (to be described later), and header-2 of the first-half header portion H1 and header-3 of second-half header portion H2 are close to each other. With this arrangement, the first-half header portion H1 and second-half header portion H2 have a staggered header structure.

A sector whose address is represented by a sector number immediately preceding to sector number #(n) of the recording portion Tn2 of groove sector #(n) is groove sector #(n−1), unlike the above-described first sector. The recording portion Tn1 of groove sector #(n−1) is formed on the same track as that of the recording portion Tn2 of groove sector #(n) via the area occupied by the first-half header portion H1 which is formed between the recording portion Tn1 and the start portion of the second-half header portion H2 as the header portion of groove sector #(n).

Similarly, a sector whose address is represented by a sector number immediately preceding to sector number #(n+N) of the recording portion T(n+1)2 of land sector #(n+N) is land sector #(n+N−1). The recording portion T(n+1)1 of groove sector #(n+N−1) is formed on the same track as that of the recording portion T(n+1)2 of land sector #(n+N) to be close to the start portion of the first-half header portion H1 as the header portion of land sector #(n+N).

Manufacturing of the information recording/reproducing optical disk having the above arrangement will be described next by referring to FIG. 5 and FIGS. 8 to 10.

When an optical disk is to be manufactured, a master having a three-dimensional pattern corresponding to grooves or pits is formed first by a technique called cutting. The three-dimensional pattern formed on the master is transferred to a stamper. A resin to which the three-dimensional pattern is transferred using the stamper is formed. This resin is used as the substrate of an optical disk, and a recording film such as a phase change film is formed on the surface with the three-dimensional pattern by deposition or the like. A protective film for protecting the recording film is formed on the recording film by coating or the like. In this way, an optical disk having grooves and pits is manufactured. When optical disk substrates having the above structure are laminated via an intermediate layer consisting of the same material as that of the protective film, a laminated optical disk can be manufactured.

FIG. 5 shows a master recording apparatus for recording the three-dimensional pattern corresponding to the grooves and pits on the master by cutting.

In this master recording apparatus, a laser beam (e.g., an argon (Ar) laser or krypton (Kr) laser) emitted from a laser source 41 is incident on a laser optical axis control system 42 for adjusting the optical axis to cope with a variation in optical axis of the laser beam due to a change in temperature or the like. The laser beam is reflected by a mirror 43 and modulated into a laser beam having a given signal by a beam modulation system 44 having electro-optical effect (EO) modulators 44a and 44b controlled by a format circuit 49. At this time, the laser beam can be modulated into a predetermined format signal. The format circuit 49 controls the beam modulation system 44 to modulate the laser beam in accordance with the cutting operation (to be described later). Subsequently, the diameter or shape of the laser beam is adjusted through a beam shaping system 45 having a pin hole or slit. The laser beam is adjusted in this manner, and the beam shape can be confirmed by a beam monitoring system 46.

The laser beam is then guided by a mirror 47 and focused and irradiated on an optical recording master 40 through an objective lens 48. As the optical recording master 40, e.g., a glass disk is used. The glass disk is coated with a photosensitive material (photoresist), and the laser beam is irradiated on the surface of the photosensitive material. A portion exposed to the laser beam obtains a recessed portion upon etching. A desired three-dimensional pattern is formed on the surface by irradiating the laser beam, so the grooves and format pattern are recorded. A stamper is manufactured on the basis of the glass disk processed in the above manner.

In cutting, the glass disk 40 is rotated at a constant speed by a rotation means 39 such as an electric motor. In addition, an optical pickup having the objective lens 48, which irradiates the laser beam on a predetermined position of the glass disk 40, moves outward from the inside of the glass disk 40 at a predetermined speed. In cutting, the optical pickup performs uniform motion outward from the inside at a rate of one track pitch per revolution of the disk to move the laser irradiation position according to this movement. A portion irradiated with the laser beam by the optical pickup moving in this manner becomes a groove, and a portion not irradiated with the laser beam becomes a land. In the header portion, the three-dimensional pattern or recessed pattern corresponding to pits is formed by flickering the laser beam.

The cutting operation in this embodiment will be described next with reference to FIGS. 4A and 4B as well as FIGS. 8 to 10.

In FIG. 4A, assume that cutting of the recording portion T(n−1)4 of land sector #(m−1) whose address is represented by sector number #(m−1) is ended at time t0.

Note that in the land area such as the recording portion T(n−1)4 of land sector #(m−1), laser irradiation from the optical pickup is not performed, and only movement of the laser irradiation position is performed. This movement of the laser irradiation position is performed by moving the optical pickup and driving the objective lens provided in the optical pickup.

After processing of the recording portion T(n−1)4 of land sector #(m−1) is ended at time t0, the laser irradiation position is shifted outward from the track center of the recording portion T(n−1)4 of land sector #(m−1) by ½ the track pitch. Header-1 and header-2, i.e., the first-half header portion HF1 with sector number #(m+N), are recorded at this displaced or shifted track position. At this time, the laser beam irradiated from the optical pickup is flickered to form pits corresponding to information representing sector number #(m+N). Header-1 of the first-half header portion HF1 is recorded close to the recording portion T(n−1)4 of land sector #(m−1). After header-1 is recorded, header-2 of the first-half header portion HF1 is continuously recorded next to header-1.

When header-1 and header-2, i.e., the first-half header portion HF1 with sector number #(m+N), have been recorded by cutting, the laser irradiation position is moved inward from the track center of header-1 and header-2 by one track pitch. More specifically, the laser irradiation position is shifted inward from the track center of the recording portion T(n−1)4 of land sector #(m−1) by ½ the track pitch. Header-3 and header-4, i.e., the second-half header portion HF2 with sector number #(m), are recorded at the shifted track position. At this time, the laser beam irradiated from the optical pickup is flickered to form pits corresponding to information representing sector number #(m). Header-3 of the second-half header portion HF2 is recorded close to header-2 of the first-half header portion HF1. After header-3 is recorded, header-4 of the second-half header portion HF2 is continuously recorded next to header-3.

When header-3 and header-4, i.e., the second-half header portion HF2 with sector number #(m), have been recorded by cutting, the recording portion Tn1 of groove sector #(m) is recorded via the mirror portion by cutting. At this time, the laser beam is not irradiated on the mirror portion. The laser irradiation position is moved outward from the track center of header-3 and header-4 with sector number #(m) by ½ the track pitch. More specifically, the laser irradiation position is shifted to the same position as the track center of the recording portion T(n−1)4 of land sector #(m−1), which is moved inward from the track center of header-1 and header-2 with sector number #(m+N) by ½ the track pitch.

The recording portion Tn1 of groove sector #(m) is recorded at this shifted track position by cutting.

At the recording portion Tn1 of groove sector #(m), the laser beam is irradiated, and etching is performed using the photosensitive material to form a recessed portion, i.e., a groove. At this time, the spot of laser beam is sinusoidally oscillated outward from the inside, i.e., in the radial direction of the disk at a period of, e.g., 186 channel bits to form a waved groove. A signal component obtained from this waved groove can be used as a reference signal for clock generation in a data write (i.e., when information is to be recorded on the information recording/reproducing optical disk 1).

All sectors on one track from sector numbers #(m) to #(m+N−1) are groove sectors. In these groove sectors, cutting recording is performed following a predetermined procedure to be described below. Cutting for sectors other than first sectors will be described with reference to FIG. 4B.

In FIG. 4B, assume that cutting of the recording portion Tn1 of groove sector #(n−1) whose address is represented by sector number #(n−1) is ended at time t1. After processing of the recording portion Tn1 of groove sector #(n−1) is ended, the laser irradiation position is shifted outward from the track center of the recording portion Tn1 of groove sector #(n−1). Header-1 and header-2, i.e., the first-half header portion H1 with sector number #(n+N), are recorded at this shifted track position. At this time, the laser beam irradiated from the optical pickup is flickered to form pits corresponding to information representing sector number. Header 1 of the first-half header portion H1 is recorded close to recording portion Tn1 of land sector #(n−1). After header-1 is recorded, header-2 of the first-half header portion H1 is continuously recorded next to header-1.

When header-1 and header-2, i.e., the first-half header portion H1 with sector number #(n+N), have been recorded by cutting, the laser irradiation position is moved inward from the track center of header-1 and header-2 by one track pitch. More specifically, the laser irradiation position is shifted inward from the track center of the recording portion Tn1 of groove sector #(n−1) by ½ the track pitch. Header-3 and header-4, i.e., the second-half header portion H2 with sector number #(n), are recorded at the shifted track position. At this time, the laser beam irradiated from the optical pickup is flickered to form pits corresponding to information representing sector number. Header-3 of the second-half header portion H2 is recorded close to header-2 of the first-half header portion H1. After header-3 is recorded, header-4 of the second-half header portion H2 is continuously recorded next to header-3.

When header-3 and header-4, i.e., the second-half header portion H2 with sector number #(n), have been recorded by cutting, t he recording portion Tn2 of groove sector #(n) is recorded via the mirror portion by cutting. At this time, the laser beam is not irradiated on the mirror portion. The laser irradiation position is moved outward from the track center of header-3 and header-4 with sector number #(n) by ½ the track pitch. More specifically, the laser irradiation position is shifted to the same position as the track center of the recording portion Tn1 of land sector #(n−1), which is moved inward from the track center of header-1 and header-2 with sector number #(n+N) by ½ the track pitch.

The recording portion Tn2 of groove sector #(n) is recorded at this shifted track position by cutting. At the recording portion Tn2 of groove sector #(n), the laser beam is irradiated, and etching is performed using the photosensitive material to form a recessed portion, i.e., a groove. At this time, the spot of laser beam is sinusoidally oscillated outward from the inside, i.e., in the radial direction of the disk 1 at a period of, e.g., 186 channel bits to form a waved groove. A signal component obtained from this waved groove can be used as a reference signal for clock generation in a data write.

By repeating the same operation as the cutting operation from the groove sectors #(n−1) to #(n), cutting recording from the recording portion Tn1 of the groove sector with sector number #(m) to the recording portion Tn4 of the groove sector with sector number # n+N−1) shown in FIG. 4A is performed.

After cutting recording from the recording portion Tn1 of groove sector #(m) to the recording portion Tn4 of groove sector #(n+N−1), cutting of the first sector shown in FIG. 4A is performed. At this time, the first sector is land sector #(m+N) next to groove sector #(m+N−1). All sectors on one track from sector numbers #(m+N) to #(m+2N−1) are land sectors. Therefore, no laser beam is emitted in cutting one track from land sector #(m+N) to land sector #(m+2N−1). The header portion of each land sector is formed at the time of cutting of the groove sector at a position shifted inward by one track.

After cutting from the land sector with sector number #(m+N) to the land sector with sector number #(m+2N−1) has been performed, cutting of a first sector is performed again. The first sector to be processed this time is groove sector #(m+2N) subsequent to land sector #(m+2N). Cutting of sectors from this groove sector #(m+2N) is performed by the same operation as that for sectors from groove sector

(m). By repeating this operation, sectors having the header structure shown in FIGS. 4A, 4B are formed.

When the above-described recording is performed by cutting, the header portion of a groove sector, i.e., the second-half header portion constituted by header-3 and header-4 and the recording portion of a groove sector with the same sector number as that of this header portion are continuously recorded by cutting. For example, the second-half header portion HF2 constituted by header-3 and header-4 with sector number #(m) and the recording portion Tn1 of groove sector #(m) are continuously cut.

However, the header portion of a land sector, i.e., the first-half header portion constituted by header-1 and header-2 and the recording portion of a land sector with the same sector number as that of this header portion are not continuously recorded by cutting but recorded at positions shifted by one track. For example, the first-half header portion HF1 constituted by header-1 and header-2 with sector number #(m+N) and the recording portion T(n+1)1 of land sector #(m+N) are recorded at positions shifted by one track. If the disk rotation period is different from the recording signal period for N sectors, the header portion of a land sector is recorded by cutting while being shifted from the recording portion of a land sector whose sector number is indicated by the header portion.

A sector format according to the embodiment of the present invention, which allows reliable header portion detection even when information is to be recorded/reproduced in/from an optical disk 1 on which a header portion is recorded by cutting with a shift, will be described next.

FIG. 6A shows the entire structure of a sector according to the embodiment of the present invention. FIG. 6B shows details of the header portion of the sector.

In FIG. 6A, the sector consists of a total of 2,697 bytes: "Header field" (to be referred to as a header portion hereinafter) of 128 bytes, "Mirror field" (to be referred to as a mirror portion hereinafter) of 2 bytes, and "Recording field" (to be referred to as a recording portion hereinafter) of 2,567 bytes. These header portion, mirror portion, and recording portion are the same as those described above with reference to FIGS. 4A and 4B.

The header portion and the mirror portion have already been recorded as three-dimensional patterns before shipment of the optical disk. The operation of recording a three-dimensional pattern according to a predetermined format on the optical disk in advance before shipment is called preformatting.

At the recording portion, information which is identified on the basis of address information indicated by the corresponding header portion is to be recorded according to a predetermined format by the user of the optical disk after shipment of the optical disk. In the preformatted state, only a groove or land as an area where information is to be recorded is formed at this recording portion.

To record information on this recording portion of, e.g., a phase change optical disk, a laser beam modulated in correspondence with information to be recorded is irradiated on the phase change recording film formed on the recording portion to form crystalline and amorphous areas on the recording film. The user reproduces the information using the difference in reflectance between the crystalline state and amorphous state of the recording film at the recording portion due to a change in optical characteristics.

Information is recorded on this recording portion in accordance with a format constituted by a gap portion (Gap field) of (10+J/16) bytes, a guard 1 portion (Guard 1 field) of (20+K) bytes, a VFO3 portion (VFO3 field) of 35 bytes, a presync portion (PS field) of 3 bytes, a data portion (Data field) of 2,418 bytes, a PA3 portion (PS3 field) of 1 byte, a Guard 2 portion (Guard2 field) of (55−K) bytes, and a buffer portion (Buffer field) of (25−J/16) bytes. J is an integer from 0 to 15, and K is an integer from 0 to 7. Both take random values.

FIG. 6B shows the contents of a header portion based on the sector format of the optical disk according to the embodiment of the present invention. The header portion shown in FIG. 6B is constituted by header-1 field, header-2 field, header-3 field, and header-4 field. These fields are the same as those described above with reference to FIGS. 4A and 4B. These fields will be referred to as header-1, header-2, header-3, and header-4 hereinafter. Note that header-1 has a length of 46 bytes, header-2 has a length of 18 bytes, header-3 has a length of 46 bytes, and header-4 has a length of 18 bytes, i.e., the header portion has a total length of 128 bytes, for example.

Each of header-1, header-2, header-3, and header-4 is constituted by a VFO portion, an AM portion, a PID portion, an IED portion, and a PA portion. This arrangement will be described below.

The VFO (Voltage Frequency Oscillator) portion is a pull-in area for PLL (Phase Locked Loop). More specifically, this VFO portion is formed from a continuously repeated data pattern for causing a PLL circuit in an optical disk device (to be described later) to extract a synchronous signal (clock signal) which is used for a data read or optical disk rotational speed control in synchronism with information read and reproduced from the optical disk by the optical disk device for recording/reproducing information in/from the optical disk 1. This data pattern is continuously repeated to completely pull in synchronization by being locked with the PLL. When the PLL is locked with the data pattern, and synchronization is completely pulled in to generate a clock signal, the code pattern of the VFO also varies according to a change in rotation of the optical disk. For this reason, reliable data read or disk rotation control can be realized.

The VFO portion has a length of 36 bytes in header-1 or header-3 as VFO1 or has a length of 8 bytes in header-2 or header-4 as VFO2. More specifically, a first-half header portion is formed from header-1 and header-2 and used as the header portion of a land sector. The VFO portion of header-1 as the start portion of the first-half header portion is longer than that of header-2 on which a laser beam is irradiated subsequent to header-1. Similarly, a second-half header portion is formed from header-3 and header-4 and used as the header portion of a groove sector. The VFO portion of header-3 as the start portion of the second-half header portion is longer than that of header-4 on which the laser beam is irradiated subsequent to header-3. Normally, the PLL can be pulled in by setting the length of the VFO portion of each sector to at least 8 bytes.

When the VFO portion of header-1 or header-3 corresponding to the start portion of each sector is made longer than that of header-2 or header-4 which is not the start portion, the PLL can be more properly pulled in by the VFO portion. Therefore, the header portion of each sector can be more reliably detected, and information can be more reliably recorded/reproduced.

When information is to be recorded/reproduced in/from the optical disk on which the header portion of a land sector is recorded by cutting with a shift, the long VFO portion of header-1 as the start portion of a land sector is particularly effective.

More specifically, for a land sector, cutting of the header portion and cutting of the recording portion of a land sector whose sector number is indicated by the header portion have a time lag corresponding to one spiral track. If the disk rotation period and the recording signal period for N sectors are different, the header portion of the land sector is recorded by cutting while being shifted from the recording portion of the land sector whose sector number is indicated by the header portion. If a deviation is present between the header portion and the recording portion, header portion detection becomes harder than in the normal state. If an offset or the like is generated for tracking in addition to the deviation of header portion, the quality of a reproduced signal at the header portion of the land sector may be different from that at the recording portion of the land sector whose sector number is indicated by the header portion. This also makes header portion detection more difficult than in the normal state.

However, even in such a case, since the VFO portion of header-1 at the start portion of the land sector is long, the PLL can be reliably pulled in. The header detection accuracy increases, so the header portion can be properly and reliably detected.

The AM (Address Mark) is a synchronous code having a length of 3 bytes and is used to determine the word boundary in demodulation. The PID (Physical ID) is constituted by 1-byte long sector information and a 3-byte long sector number. The cED (ID Error Detection code) is a code for detecting an error in the 4-byte PID and has a length of 2 bytes. The PA (Post Amble) is a code necessary for setting the state of preceding bytes in demodulation and has a length of 1 byte.

Reading of the emboss or recessed portion of the information recording/reproducing optical disk having the above-described header structure, i.e., the header portion constituted by three-dimensional pits in information recording/reproduction will be described next.

Figure 7:
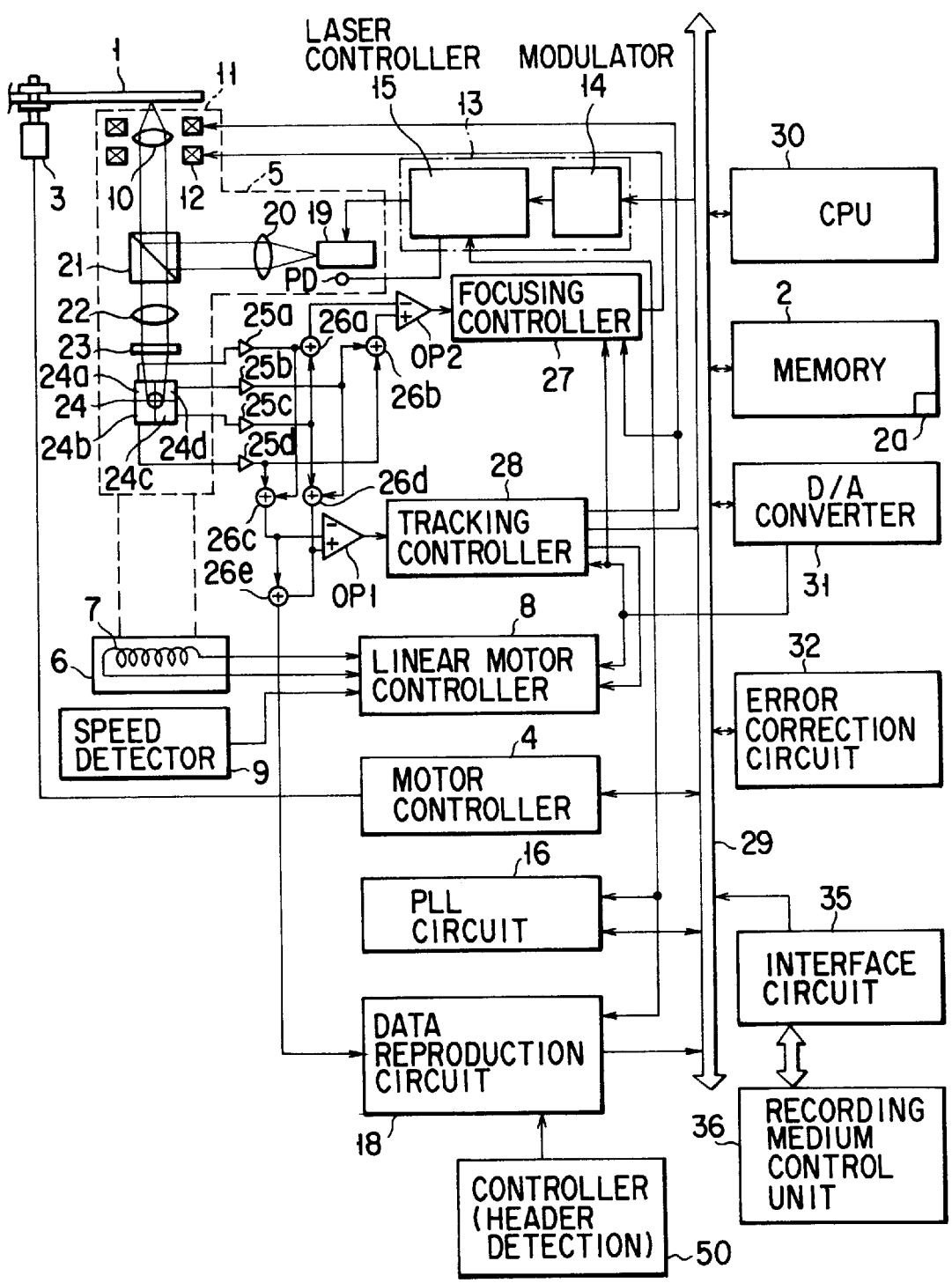
FIG. 7 is a block diagram for illustrating the whole structure of an optical disk device for recording/reproducing information on/from the information recording/reproducing optical disk according to the embodiment of the invention.

FIG. 7 is a block diagram showing the entire arrangement of the optical disk device for recording/reproducing information in/from the information recording/reproducing optical disk 1.

Referring to FIG. 7, the information recording/reproduction optical disk 1 as a disk-like information storage medium is rotated by a motor 3 at, e.g., a predetermined linear speed. The motor 3 is controlled by a motor controller 4. Information is recorded/reproduced in/from the optical disk 1 by an optical pickup 5. The optical pickup 5 is fixed to a driving coil 7 constituting the movable portion of a linear motor 6. The driving coil 7 is connected to a linear motor controller 8.

The linear motor controller 8 is connected to a speed detector 9, so the speed signal of the optical pickup 5 detected by the speed detector 9 is sent to the linear motor controller 8. A permanent magnet (not shown) is arranged at the stationary portion of the linear motor 6. When the driving coil 7 is excited by the linear motor controller 8, the optical pickup 5 is moved in the radial direction of the optical disk 1.

An objective lens 10 supported by a wire or leaf spring (not shown) is arranged in the optical pickup 5. The objective lens 10 can be moved along the focusing direction (direction of optical axis of the lens) by a driving coil 11 and can also be moved along the tracking direction (direction perpendicular to the optical axis of the lens) by a driving coil 12.

A laser beam is emitted from a semiconductor laser oscillator 19 under the control of a laser controller 13. The laser controller 13 comprises a modulator 14 and a laser driving circuit 15 and operates in synchronism with a recording clock signal supplied from a PLL circuit 16. The modulator 14 modulates recording data supplied from an error correction circuit 32 into a signal suitable for recording, e.g., 8–16 modulated data. The laser driving circuit 15 drives the semiconductor laser oscillator (or an argon-neon laser oscillator) 19 in accordance with the 8–16 modulated data from the modulator 14.

In recording, the PLL circuit 16 divides the frequency of the fundamental clock signal generated from a quartz oscillator into a frequency corresponding to the recording position on the optical disk 1, thereby generating a recording clock signal. In reproduction, the PLL circuit 16 generates a reproduction clock signal corresponding to a reproduced synchronous code and detects the frequency error of the reproduction clock signal. This frequency error detection is performed on the basis of whether the frequency of the reproduction clock signal is within a predetermined frequency range corresponding to the recording position of the data to be reproduced from the optical disk 1. The PLL circuit 16 also selectively outputs the recording or reproduction clock signal in accordance with a control signal from a CPU 30 and a signal from a binary circuit in a data reproduction circuit 18.

The laser beam emitted from the semiconductor laser oscillator 19 is irradiated on the optical disk 1 through a collimator lens 20, a half prism 21, and the objective lens 10. The reflected light from the optical disk 1 is guided to a photodetector 24 through the objective lens 10, the half prism 21, a condenser lens 22, and a cylindrical lens 23.

The photodetector 24 is divided into four photodetecting cells 24a to 24d. The output signal from the photodetecting cell 24a is supplied to one terminal of an adder 26a through an amplifier 25a. The output signal from the photodetecting cell 24b is supplied to one terminal of an adder 26b through an amplifier 25b. The output signal from the photodetecting cell 24c is supplied to the other terminal of the adder 26a through an amplifier 25c. The output signal from the photodetecting cell 24d is supplied to the other terminal of the adder 26b through an amplifier 25d.

The output signal from the photodetecting cell 24a is also supplied to one terminal of an adder 26c through the amplifier 25a. The output signal from the photodetecting cell 24b is also supplied to one terminal of an adder 26d through the amplifier 25b. The output signal from the photodetecting cell 24c is also supplied to the other terminal of the adder 26d through the amplifier 25c. The output signal from the photodetecting cell 24d is also supplied to the other terminal of the adder 26c through the amplifier 25d.

The output signal from the adder 26a is supplied to the inverting input terminal of a differential amplifier OP2. The output signal from the adder 26b is supplied to the noninverting input terminal of the differential amplifier OP2. The differential amplifier OP2 outputs a signal associated with a focal point corresponding to the difference between the output signals from the adders 26a and 26b. This output signal is supplied to a focusing controller 27. The output signal from the focusing controller 27 is supplied to the focusing driving coil 12, so that control is performed to always bring the laser beam to an in-focus position on the optical disk 1.

The output signal from the adder 26c is supplied to the inverting input terminal of a differential amplifier OP1. The output signal from the adder 26d is supplied to the noninverting input terminal of the differential amplifier OP1. The differential amplifier OP1 outputs a track difference signal corresponding to the difference between the output signals from the adders 26c and 26d. This output signal is supplied to a tracking controller 28. The tracking controller 28 generates a track driving signal in accordance with the track difference signal from the differential amplifier OP1.

The track driving signal output from the tracking controller 28 is supplied to the driving coil 11 in the tracking direction. The track difference signal used by the tracking controller 28 is supplied to the linear motor controller 8.

Once focusing control and tracking control are performed in the above manner, a change in reflectance of the beam reflected by a pit formed on a track header of the optical disk 1 is reflected to the sum signal of output signals from the photodetecting cells 24a to 24d of the photodetector 24, i.e., the output signal from an adder 26e as the sum of the output signals from the adders 26c and 26d. This signal is supplied to the data reproduction circuit 18. The data reproduction circuit 18 reproduces recorded data on the basis of the reproduction clock signal from the PLL circuit 16 and a header detection signal supplied from a control circuit 50. This control circuit 50 may be incorporated with the CPU 30.

The data reproduction circuit 18 also detects a sector mark in the preformat data on the basis of the output signal from the adder 26e and the reproduction clock signal from the PLL circuit 16, and simultaneously, reproduces, from a binary signal supplied from the PLL circuit 16, a track number and sector number as address information on the basis of the binary signal and reproduction clock signal.

The reproduced data from the data reproduction circuit 18 is supplied to the error correction circuit 32 through a bus 29. The error correction circuit 32 corrects an error using an error correction code (ECC) in the reproduced data or adds the error correction code (ECC) to recording data supplied from an interface circuit 35 and outputs the data to a memory 2A.

The reproduced data error-corrected by the error correction circuit 32 is supplied to a recording medium control unit 36 as an external unit through the bus 29 and the interface circuit 35. Recording data output from the recording medium control unit 36 is supplied to the error correction circuit 32 through the interface circuit 35 and the bus 29.

When the objective lens 10 is being moved by the tracking controller 28, the linear motor 6, i.e., the optical pickup 5 is moved by the linear motor controller 8 such that the objective lens 10 is positioned near the center of the optical pickup 5.

A D/A converter 31 is used to information exchange between the focusing controller 27, tracking controller 28, and linear motor controller 8, and the CPU 30 for controlling the entire optical disk device.

The motor controller 4, the linear motor controller 8, the laser driving circuit 15, the PLL circuit 16, the data reproduction circuit 18, the focusing controller 27, the tracking controller 28, the error correction circuit 32, and the like are controlled by the CPU 30 through the bus 29. The CPU 30 performs a predetermined operation on the basis of a program recorded on the memory 2A.

A case wherein the preformatted header portion of the information recording/reproducing optical disk 1 according to the present invention is read in recording/reproducing information in/from the optical disk 1 using the optical disk device having the above arrangement will be described below with reference to FIGS. 4A and 4B.

In FIG. 4A, when the header portion to be read is the header portion of the first sector S1, e.g., the header portion HF2 of the groove sector indicated by sector number #(m), the laser beam is irradiated on the recording portion T(n−1)4 of the land sector indicated by sector number #(m−1) prior to reading of the header portion HF2. The laser spot irradiated on the recording portion T(n−1)4 traces the track center of the recording portion T(n−1)4. This laser spot tracing is performed under the tracking control of the optical disk device described above with reference to FIG. 7.

The laser beam irradiated on the recording portion T(n−1)4 of the land sector indicated by sector number #(m−1) while tracing the track center is then irradiated on the header portions HF1 and HF2 recorded on the header region HD1 of the optical disk 1.

As described above, the header portions HF1 and HF2 are constituted by data having a total length of 128 bytes. Assume that data of one byte has a length of about 3 micron on the disk 1. In this case, the header portions HF1 and HF2 have a length of about 400 micron. It is also assumed that the laser beam is irradiated on the disk 1 at a linear speed of about 6 m/s. The laser spot passes the header portions HF1 and HF2 in a time of about 67 microsecond.

Even when the header portions are staggered in such a short time as shown in FIGS. 4A and 4B, the band of the tracking control system is so narrow that the light spot cannot follow the staggered header portions instantaneously. Therefore, it can be considered that the light spot traces a virtual track center. Although this virtual track center is different from the real track centers of each of the header portions HF1 and HF2, data such as address information preformatted on the header portions HF1 and HF2 can be sufficiently read, because at least a half area of the light spot can trace the half area of the header portions HF1 and HF2. After the header portions HF1 and HF2 are read, the laser beam irradiated from the optical pickup passes the mirror portion and then is irradiated on the recording portion Tn1 of the groove sector indicated by sector number #(m) while tracing the track center thereof.

In this case, the recording portion of the sector on which the laser beam is irradiated subsequent to the header portions HF1 and HF2 is the recording portion Tn1 of the groove sector. As described above, the header portion used in the groove sector is the second-half header portion constituted by header-3 and header-4. Of the already read header portions HF1 and HF2, the header portion HF2 corresponds to the second-half header portion. Therefore, the second-half header portion HF2 is used as the header portion of the recording portion Tn1, and the address information of the recording portion Tn1 is indicated by the second-half header portion HF2.

As described above, in the optical disk according to the present invention header sections arranged in a staggered pattern are formed. FIG. 8 is a schematic diagram showing the structure of the header portions in the staggered pattern and the corresponding recording sections. In FIG. 8, the upper portion thereof and the lower portion thereof correspond to the inner peripheral side of the disk and the outer peripheral side thereof, respectively. Thus, the vertical direction corresponds to the radius direction of the disk.

FIGS. 4A and 4B show that the first half headers HF1 and HF3 and the second half headers HF2 and HF4 are arranged to have two header portions HEADER 1, HEADER 2 and HEADER 3, HEADER 4, respectively, and these header portions HEADER 1 to HEADER 4 have various items of information as shown in FIG. 6B. In FIG. 8, only first-half header portions and second-half header portions are shown. However, the header portions having the structure shown in FIGS. 4A and 4B may be used in the embodiment of FIG. 8.

Figure 8:
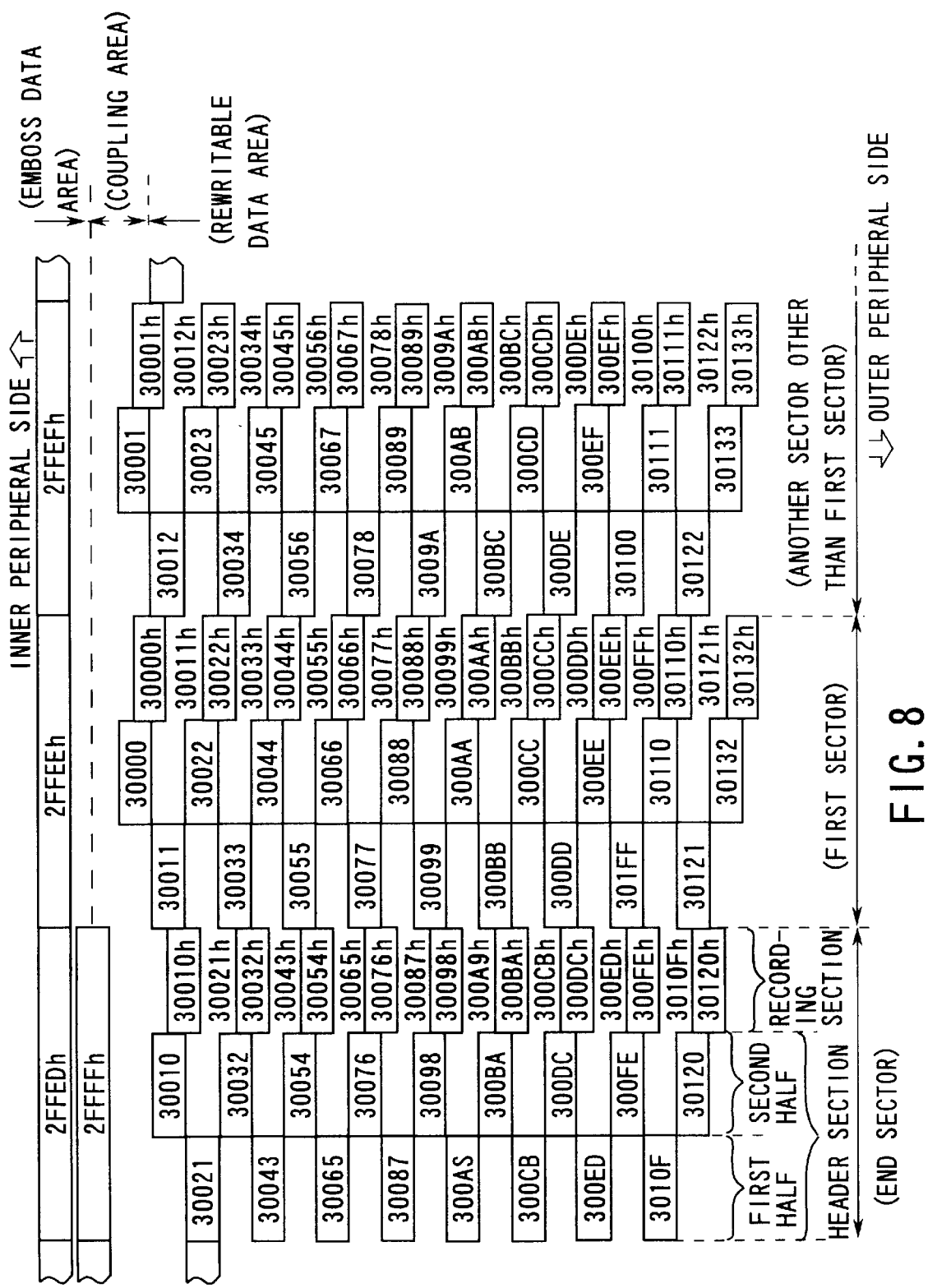
FIG. 8 is a schematic view for showing header portions arranged in a staggered pattern and the adjacent track portions arranged around the header portions in an information recording/reproducing optical disk according to the embodiment of the invention.
Figure 9:
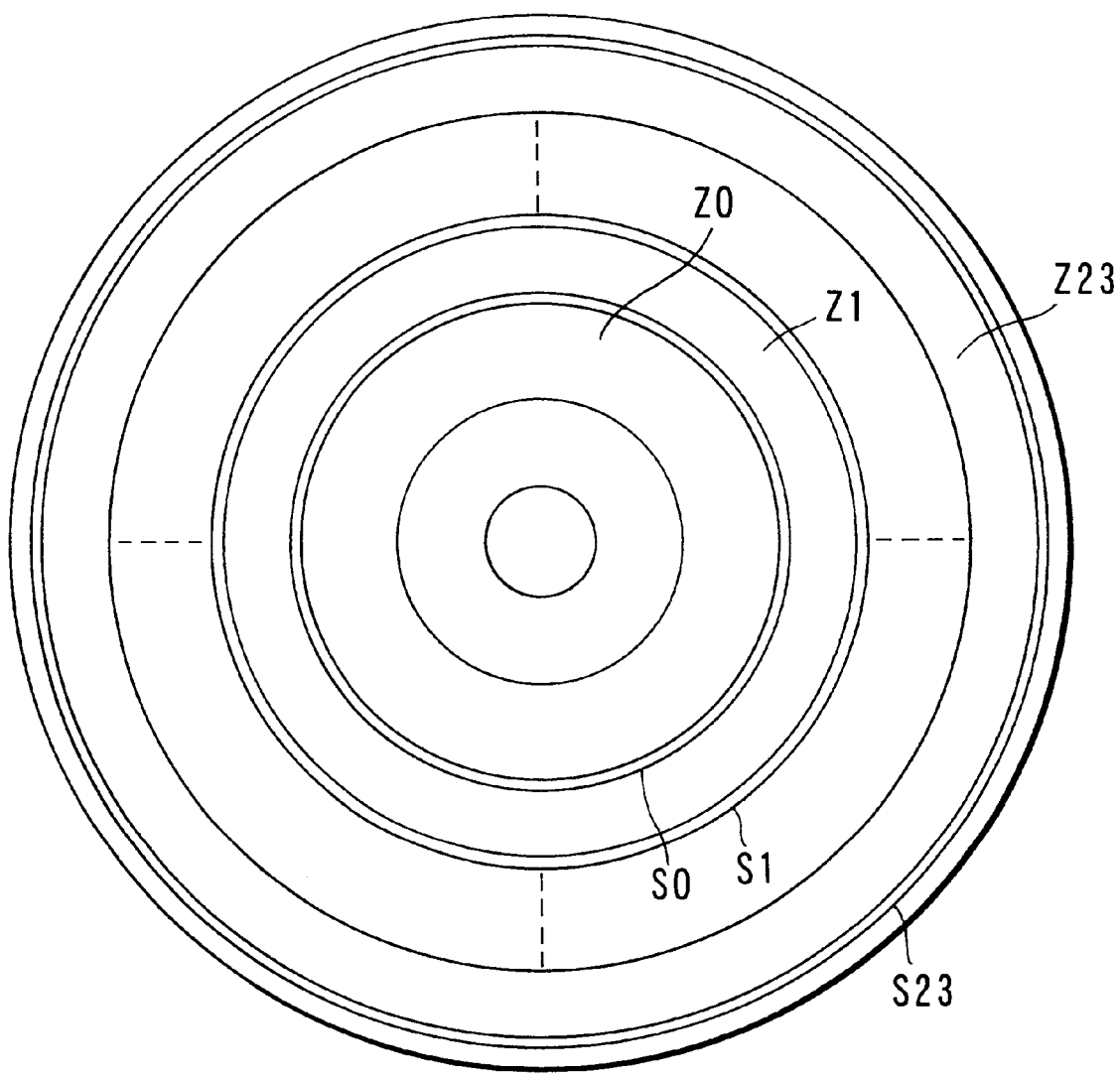
FIG. 9 is a schematic view for showing an information recording portion, of an information recording/reproducing optical disk according to the embodiment of the invention, which is divided into plural ring zones.

FIG. 8 shows an end sector, a first sector and a second sector having sector addresses of 30000 h–30133 h, as an example. In the figure, the second sector is shown as another sector other than the first sector. The character "h" attached to the address numbers is an abbreviation of hexadecimal and the address numbers having "h" are represented according to the hexadecimal system. In FIG. 8, the sections including the hexadecimal numbers are shown as recording sections or portions and the sections including only numbers to which the character "h" is not attached are shown as the header portions.

In the recording portions of the respective sectors, the sectors having the sector addresses of 30000 h, 30001 h, 30010 h, 30022 h, 30023 h . . . are grooves, and the sectors having the sector addresses of 30011 h, 30012 h, 30021 h, 30033 h, 30034 h . . . are lands.

In this case, the header portion shown by a certain number and the recording portion in which the character "h" is attached to the same number as showing this header portion make a pair to form the same sector. When in this figure the header portion shown by 30000 is described as (30000 h) header portion and the recording portion of the groove sector shown by 30000 h is described as (30000 h) groove sector-recording portion, for example, the (30000 h) header portion and the (30000 h) groove sector-recording portion constitute a pair to form the same sector. In this case, the sector information of the sector address 30000 h is recorded by preformatting in the (30000 h) header portion. Thus, a user records the information shown by the sector address 30000 h, on the (30000 h) groove sector-recording portion.

The same structure as the header portion of the present invention explained referring to FIGS. 4A and 4B is schematically illustrated in FIG. 8. The optical disk having the header portions of the structure illustrated in FIG. 8 is formed so that in tracing the track spirally the tracking polarity is switched alternately in order of land, groove, land, and groove polarities, without track jump, every one spiral track.

In FIG. 8, the number of the sectors in the single spiral track is 17 (11 h according to the hexadecimal system). When the track is traced in one rotation from a given point, the sector address of the track which is outwards adjacent to the given point, increases as many as seventeen. For example, the sector outwards adjacent to the sector having the sector address 30000 h has the sector address 30011 h.

In FIG. 8, the sectors having the sector addresses 30000 h, 30011 h, 30022 h, 30033 h . . . are sectors at which tracking polarity is switched, and is the above-described first sector. The sectors having the sector addresses 30010 h, 30021 h, 30032 h, 30043 h . . . and the sector addresses 30001 h, 30012 h, 30023 h, 30034 h. are other than the first sectors and the end sectors and the second sectors, respectively.

In the above-described way that the groove and the land are switched alternately in units of spiral tracks, it is necessary to switch the polarity representing the groove or land in tracking. Thus, the first sector at which the tracking polarity is switched has a different header arrangement from the other sectors.

In the first-half header portion and the second-half header portion corresponding to, for example, the (30000 h) groove sector-recording portion, the address number 30011 h and the address number 30000 h are beforehand recorded respectively by preformatting.

The (30000 h) groove sector-recording portion is a groove. Therefore, the address number 30000 h recorded in the second-half header portion is its sector address.

In the first-half header portion and the second-half header portion corresponding to, for example, the (30011 h) land sector-recording portion, the address number 30011 and the address number 30022 are beforehand recorded respectively by preformatting. The (30011 h) land sector-recording portion is a land. Therefore, the address number 30011 recorded in the first-half header portion is its sector address.

In case of the groove sectors, the staggered pattern headers have a position relationship that the first-half headers are outside wobbles or offsets and the second-half headers are inside wobbles or offsets. Specifically, the first-half header is positioned to be shifted in a half-track pitch outwards from the track position of the groove sector, and the second-half header is positioned to be shifted in a half-track pitch inwards therefrom. On the contrary, in the case of the land sectors, the staggered pattern headers have a reversible relationship, that is, a relationship that the first-half headers are inside wobbles or offsets and the second-half headers are outside wobbles or offsets.

In the way that the groove and the land are switched alternately every track cycle, it is necessary to switch the tracking polarity representing the groove or land in tracking. The timing of switching the polarity is in accordance with reading from the header portion. Specifically, information is read from the header portion, so as to decide, from the information thus obtained, whether the recording portion following the header portion is a land or a groove and then switch the tracking polarity to desired polarity before starting to track the recording portion.

When on the basis of the information obtained from the header portion the recording portion following the header is decided to be a land, the tracking polarity is set or switched to the land polarity so as to track the recording portion. When on the basis of the information obtained from the header portion the recording portion following the header is decided to be a groove, the tracking polarity is set or switched to the groove polarity so as to track the recording portion.

Referring to FIG. 4A, the tracking polarity is switched when a mirror field on the disk is irradiated with the laser beam. The information obtained from the header portion as described above is also used in order to specify the position of the mirror field. Specifically, when information can be read accurately from any one among Headers 1 to 4, the position of the mirror field can be calculated back from the position at the information is read, so as to specify the mirror filed position.

For example, when information is normally read from Header 1, counting the number of bits is started from the time when the reading from Header 1 is finished. Since the sector format of the header portions is determined beforehand as shown in FIGS. 6A and 6B, the bit number remaining from the position where the reading from Header 1 is finished to the mirror field position can be determined beforehand.

Accordingly, when the bit number determined beforehand is counted from the time when the reading from Header 1 is finished, it is concluded that the mirror field is irradiated with the laser beam, and then the tracking polarity is switched. After the tracking polarity is switched to desired polarity at this mirror field, the recording portion of the land or groove is tracked.

When the land/groove polarity is switched in the above-described manner, the relationship between the inner wobbles or offsets and the outer wobbles or offsets is used to detect the timing of the switching. The following will describe the structure and the method for detecting the land/groove switching timing by using the relationship between the inner wobbles and the outer wobbles.

A photodetector 24 illustrated in FIG. 7 is used to detect this timing. The photodetector 24 comprises photodetecting cells 24a, 24b, 24c and 24d which are divided into 4 parts. As already described, the output signal for the photodetecting cell 24a and the output signal from the photodetecting cell 24b are added at the adder 26c, and the output signal from the photodetecting cell 24c and the output signal from the photodetecting cell 24d are added at the adder 26d.

The output signal from the adder 26c is supplied to the inverting input terminal of the differential amplifier OP1, and the output signal from the adder 26d is supplied to the noninverting input terminal of the differential amplifier OP1. The differential amplifier OP1 outputs a track difference signal corresponding to the difference between the output signals from the adders 26c and 26d. This output signal is supplied to the tracking controller 28. The tracking controller 28 generates a track driving signal in accordance with the track difference signal from the differential amplifier OP1.

The track driving signal outputted from the tracking controller 28 is supplied to the driving coil 11 in the tracking direction. The track difference signal used by the tracking controller 28 is supplied to the liner motor controller 8. Thus, tracking control is performed.

Considering the photodetector 24 as a body divided into two parts, that is, the first pair of the photodetecting cells 24a and 24b and the second pair of the photodetecting cells 24c and 24d, the two pairs are divided correspondingly to the direction along the record track on the optical disk.

For explanation, it is assumed that the first pair of the photodetecting cells, among the photodetector divided into two parts, is positioned so as to correspond to the outer peripheral side of the record track, and that the output signal from the first pair is represented by "A". It is also assumed that the second pair of the photodetecting cells, among the photodetector divided into two parts, is positioned so as to correspond to the inner peripheral side of the record track, and that the output signal from the second pair is represented by "B".

Thus, in the case of irradiating the track with a light beam so that the beam traces the track, the output signal A increases and the output signal B decreases when the light beam passes the header portion wobbled or offset outwards. On the contrary, the output signal B increases and the output signal A decreases when the light beam passes the header portion wobbled inwards.

When the (A–B) signal, which is the difference between both the signals, is generated, the following is satisfied: (A–B)>0 at the header portion wobbled outwards; (A–B)<0 at the header portion wobbled inwards; and (A–B)=0 at the position other than them. For simplification, the states of (A–B)>0, (A–B)<0 and (A–B)=0 are represented by "+", "–", and "0", respectively.

When the (A–B) signal outputted from the photodetector 24 is used and the light beam passes the above-described groove sector, the (A–B) output signal is changed from "+" to "–" previous to irradiating the recording portion of this groove sector with the light beam. On the contrary, when the light beam passes the land sector, the (A–B) output signal is changed from "–" to "+" previous to irradiating the recording portion of this land sector with the light beam. Therefore, change in the polarity of the (A–B) output signal is monitored, through the differential amplifier OP1, by the tracking controller and then a process with the CPU 30 is performed, so as to make it possible to carry out land/groove detection and detect the timing of switching the land/groove polarity.

Specifically, when the (A–B) output signal is changed from "+" to "–", the recording portion to be subsequently irradiated with the light beam proves to be a recording portion of the groove sector. When this groove sector is a groove sector in the first sector, for normal tracking control the tracking polarity is controlled to switch the land polarity to the groove polarity.

Similarly, when the (A–B) output signal is changed from "–" to "+", the recording portion to be subsequently irradiated with the light beam proves to be a recording portion of the land sector. When this land sector is a land sector in the first sector, for normal tracking control the tracking polarity is controlled to switch the groove polarity to the land polarity.

It is possible to detect the timing of switching the land/groove polarity by using the change in the polarity of the (A–B) output signal as described above.

The following will explain a method for detecting the timing of switching the land/groove polarity by using record-information, inside a header, recorded on an optical disk by preformatting, that is, by using a sector type-bit inside a header.

Before the explanation thereof, the header structure illustrated in FIG. 8 will be described. In the optical disk having such staggered pattern header portions as illustrated in FIG. 8, adoption of the way of giving numbers to sector addresses, as already described referring to FIG. 1, makes it possible to perform cutting of a disk having a single spiral structure by continuous recording, with tracing the disk only one time from the inner periphery to the outer periphery, which has been already explained. In the cutting, a recording signal is sent out from the format circuit 49 in the master recording apparatus illustrated in FIG. 5 in the following order, so as to control the beam modulation system 44 composed of the E•O (electro-optical) modulators 44a and 44b, thereby performing the cutting in accordance with the above-described way of giving numbers to sector addresses.

The order of sending out this recording signal is as follows: the (30011 h) header portion—the (30000 h) header portion—the (30000 h)groove sector-recording portion—...—the (30021 h)header portion—the (30010 h) header portion—the (30010 h)groove sector-recording portion—(space in one track rotation)—the (30033 h) header portion—the (30022 h) header portion the (30022 h) groove sector-recording portion. (herein after omission).

Referring to FIG. 6B, the specific content in the (30011 h) header portion is an embossed header where 030011 h is recorded in lower 3 bytes of the PID 1 section (4 bytes) of Header 1 and 030011 h is also recorded in lower 3 bytes of the PID 2 section (4 bytes) of Header 2. The specific content in the (30000 h) header portion is an embossed header where 030000 h is recorded in lower 3 bytes of the PID 3 section (4 bytes) of Header 3 and 030000 h is also recorded in lower 3 bytes of the PID 4 section (4 bytes) of Header 4.

In accordance with the above-described way of giving numbers to sector addresses, it is possible to produce a land/groove recording disk having a single spiral structure. In this disk, sector addresses are successive. Thus, information is successively recorded/reproduced on/from the whole surface of the disk without any track jump nor seeking.

As described above, however, in the land/groove recording disk having a single spiral structure, switching the tracking polarity is necessary every units of the spiral tracks in order to carry out tracking control correctly. Specifically, in FIG. 8, the tracking polarity for the (30010 h) groove sector-recording portion is the groove polarity, but in sections to be subsequently irradiated with the light beam, it is necessary to track the (30011 h) header portion with the groove polarity and track the (30011 h) land sector-recording portion with the land polarity.

The method of switching the tracking polarity includes not only the above-described method of using the polarity of the (A–B) signal, but also the following method of using a sector type-bit included in a header.

FIG. 6B illustrates the contents in the PID sections inside the headers. Header 1, Header 2, Header 3 and Header 4 include the PID 1 section, the PID 2 section, the PID 3 section and the PID 4 section, respectively. The respective PID sections comprise information of 32 bits (4 bytes). The respective bits are represented by b31–b0. The bit b31 is the most significant bit (MSB), and the bit b0 is the least significant bit (LSB).

Among the bits b31–b0 constituting the PID sections, 8 bits (1 byte) of b31–b24 are bits having sector information, that is, having recorded information on a sector. 24 bits (3 bytes) of b23–b0 are bits having the sector number, that is, recorded information on the sector address.

The following will describe the content in the sector information. The bits b31 and b30 are bits for reservation, in which, for example, 0b is recorded for the time being, and for recording some information in the future. The character "b" after the number 00 in 00b is an abbreviation of "binary" and means that the number before this character "b" is a number according to the binary system. The bits b29 and b28 are bits for representing physical ID number. For the PID 1 section, the PID 2 section, the PID 3 section and the PID 4 section, 00b, 01b, 10b and 11b are recorded, respectively.

The bits b27–b25 are bits for representing the type of the sector. For a read-only sector, the first sector rewritable, the last sector rewritable, the rewritable sector directly before the last sector and other sectors, 000b, 10b, 101b, 110b and 111 are recorded, respectively. For reservation, 001b–011b are left.

The read-only sector is a sector in which data are recorded in the form of emboss, such as a read-in area section. The first sector is a sector at which the tracking polarity is switched from the groove to the land or vice versa as described above. The last sector is a sector directly before the first sector.

Referring to an example illustrated in FIG. 8, the sectors having sector addresses 30000 h, 30011 h, 30022 h, 30033 h . . . are the first sectors rewritable. The sectors having sector addresses 30010 h, 30021 h, 30032 h, 30043 h . . . are the last sectors rewritable. The sectors having sector addresses 3000 Fh, 30020 h, 30031 h, 30042 h . . . (not shown) are the rewritable sectors directly before the respective last sectors.

The sector type-bits representing their sector types can generate the timing of switching the tracking polarity, i.e., that of detecting the first sector rewritable. Specifically, sector types are recognized by reading the PID sections in the headers and then in accordance with the recognized sector types the tracking polarity is switched. Even if the first sector cannot be detected, the last sector directly before the first sector or the rewritable sector directly before the last sector can generate the switching timing to switch the tracking polarity.

In detection of the first sector accompanying the detection of the timing of switching the tracking polarity, an IED section of 2 bytes is added as illustrated in FIG. 6B so that errors can be detected. Therefore, it is possible to detect the first sector rewritable with high liability and switch the tracking polarity stably in a single spiral disk.

When the PID sections composed of the PID 1 section and the PID 2 section are represented by the first-half PID section and the PID sections composed of the PID 3 section and the PID 4 section are represented by the second-half PID section, the sector address number recorded in the first-half PID section may be compared with that recorded in the second-half PID section to use the result obtained by the comparison for switching the tracking polarity.

Specifically, for, e.g., the (30000 h) groove sector-recording portion, the first-half header portion is the (30011 h) header portion, and the second-half header portion is the (30000 h) header portion. The first-half header portion, i.e., the (30011 h) header portion has the first-half PID section wherein the sector address 30011 h is recorded. The second-half header portion, i.e., the (30000 h) header portion has the second-half PID section wherein the sector address 30000 h is recorded.

The sector address 30011 h recorded in the first-half PID section is a bigger number than the sector address 30000 h recorded in the second-half PID section. This relationship is true in all of the groove sectors having such a structure as illustrated in FIG. 8. Therefore, the header portions are irradiated with a light beam to read the sector address of the first-half PID sector and that of the second-half PID sector and compare them, and consequently, when the sector address of the first-half PID section proves to be bigger, the recording portion to be subsequently irradiated with the light beam can be decided to be a recording portion of a groove sector. Thus, the tracking polarity can be switched.

The above can be applied to the case of land sectors. For, e.g., the (30011 h) land sector-recording portion, the first-half header portion is the (30011 h) header portion, and the second-half header portion is the (30022 h) header portion. The first-half header portion, i.e., the (30011 h) header portion has the first-half PID section wherein the sector address 30011 h is recorded. The second-half header portion, i.e., the (30022 h) header portion has the second-half PID section wherein the sector address 30022 h is recorded.

The sector address 30011 h recorded in the first-half PID section is a smaller number than the sector address 30022 h recorded in the second-half PID section. This relationship is true in all of the land sectors having such a structure as illustrated in FIG. 8. Therefore, the header portions are irradiated with a light beam to read the sector address of the first-half PID section and that of the second-half PID section and compare them, and consequently, when the sector address of the first-half PID section proves to be smaller, the recording portion to be subsequently irradiated with the light beam can be decided to be a recording portion of a land sector. Thus, the tracking polarity can be switched.

The following will describe the case wherein switching the tracking polarity has been conducted unsuccessfully, or the case wherein switching the tracking polarity is not conducted intentionally and track-holding on a certain track is automatically performed.

In tracing the track with a light beam, for example, from the (30021 h) land sector-recording portion of the last sector to the (30022 h) groove sector-recording portion of the first sector, illustrated in FIG. 8, the center of the land track is usually traced with the spot of the light beam in the (30021 h) land sector-recording portion. This has been already described above. In the staggered pattern header portions composed of the (30033 h) header portion and the (30022 h) header portion, the center line between these header portions is traced with the light beam. In the (30022 h) groove sector-recording portion, the tracking polarity is switched from the land to the groove and subsequently the center of the groove track is traced with the spot of the light beam.

In this case, when the track polarity is not switched from the land to the groove after passage of the light spot through the staggered pattern header portions, tracking is controlled to trace either one of the (30011 h) land sector-recording portion or the (30033 h) land sector-recording portion with the light beam spot. This results in abnormal tracking. At this time, it is decided by various factors such as eccentricity of the disk and track offset whether the light spot is tracking-controlled on the former section or the latter section. Thus, the decision cannot be expected.

For this reason, in tracing the track with the light beam spot, track offset is intentionally applied so as not to obstruct record or reproduction. Specifically, in the case where the spiral land track and groove track are traced with the light beam spot from the inner peripheral side to the outer peripheral side, the tracks are traced with the spot at the position slightly disk-inwards from their track centers.

Thus, in the case of not switching the tracking polarity, tracking control is performed from the (30021 h) land sector-recording portion through the staggered pattern header portions to the (30011 h) land sector-recording portion. After this tracking control, the land track is traced with the light beam, in one track rotation, from the (30011 h) land sector-recording portion, so that the beam is again returned to the (30021 h) land sector-recording portion.

Thus, slight track offset which does not obstruct information recording or information reproduction is intentionally applied towards the inner peripheral side of the disk, so that the sectors having the sector addresses 30011 h, 30012 h . . . 30020 h, 30021 h, 30011 h . . . are repeatedly in this order traced with the light beam spot, with the spot being kept on the same track. In this case, it is possible to prevent substantial departure from normal tracking control even if the tracking polarity is not switched or even if the tracking polarity is switched unsuccessfully.

In FIG. 8, an emboss data area is illustrated at the inner peripheral side as compared with the rewritable data area having the above-described staggered pattern header structure. The emboss data area is a read-only data area. Data are recorded thereon by a sector format for a read-only disk, not by the sector format according to the rewritable staggered pattern header structure. In the emboss data area, data are recorded in the form of the emboss composed of uneven pits. A jointing area composed of a mirror field is located between the emboss data area and the rewritable data area.

In such an emboss data area, recorded is information on a reference signal, a physical format, production of the disk, a supplier of the disk or the like. This area is used as a read-in area from which information can be read with a conventionally-used read-only player. This makes easy discrimination of the disk possible even if the conventional read-only player cannot read information recorded by the sector format according to the staggered pattern header.

It is preferable to use a so-called zone CLV way or zone CAV way for a land/groove recording optical disk having staggered pattern header portions.

A single spiral structure having staggered pattern header portions makes it possible to record information on the land and the groove, resulting in increase in recording capacity, and to access the whole surface of the disk for a short time, as described above. The zone CLV way or the zone CAV way makes it possible to simplify control of the rotation speed of the equipped spindle motor. Thus, it is suitable for high speed access. For these reasons, it is possible to make access speed higher by combining the zone CLV way or the zone CAV way with the single spiral structure having staggered pattern header portions according to the present invention.

In, for example, the zone CLV way, the surface of an optical disk 1 is divided into plural ring zones Z0, Z1, . . . Z23, as illustrated in FIG. 9. In the respective zones obtained by the division, information is recorded by the sector format according to the singe spiral structure having the above-described staggered pattern header portions. In each of the zones obtained by the division, the rotation number or the rotation velocity of the disk is switched to control the linearly speed of tracing the disk surface into a substantially constant value. In the respective zones, it is possible to read information at a substantially constant linear velocity by relatively easy speed-variable control of the disk rotation number, which is for controlling the rotation number into a substantially constant. Thus, high speed access can be realized.

However, in order to record/reproduce information on/from the surface extending over plural zones, it is necessary to change the rotation number of the spindle motor 3. Information must be recorded/reproduced on/from the surface extending over the plural zones, for example in the case where some zone has a sector from which information cannot be reproduced because of a defect at its recording surface and the same zone does not have a spare (alternation) area for recording the information to be recorded in the defective sector substitutionally. In this case, it is necessary to change the rotation number of the spindle motor 3.

If the rotation number of the motor is changed, a long time is necessary for stabilizing the rotation number. As a result, a time for accessing data is made longer. To avoid such a harmful effect, spare areas are arranged in the respective zones. In, for example, the above-described 24-division zones, i.e., zones Z0, Z1 . . . Z23, at the respective outer peripheral side s thereof spare areas S0, S1 . . . S23 are arranged.

FIG. 10 shows an example of various factors of the respective zones Z0, Z1 . . . Z23. The factors are such as the number of sectors, the start sector number, the sector number of the inner side buffer area, the data area number, the number of data blocks, the spare sector number, the number of the spare sectors, the sector number of the outer side buffer area, the end sector number, the logical block ad dress (LBA) of the start sector in the groove, and the number of data fields of the start sector in the groove.

In FIG. 10, the number of sectors denotes the number of sectors in one spiral track. The increment of one is given as zones are shifted outwards one by one. The start sector number is the sector number of the start sector in the respective zones. That is, it represents the sector address by the hexadecimal system. The sector number of the inner side buffer area is the sector number of the buffer area disposed in the inner side of the respective zones. The buffer area is an area at the boundary between the zones, and data are not recorded therein. The data area number is the sector number of the area wherein user's data can be recorded. In order to calculate capacity of the disk, the data amount to be recorded in this area is added up. The number of data blocks is the number (by the decimal system) of ECC blocks (i.e., 16 physical sectors) which can be put in the above-described area wherein user's data can be recorded.

The spare sector number represents the sector number of the spare sector in the spare area in the respective zones by the hexadecimal system. As can be understood from FIG. 10, the sector whose sector number is bigger is positioned at the outer peripheral side. Thus, the spare area is positioned at the outer peripheral side. The number of the spare sector represents the number of sectors in the spare area by the decimal system.

The sector number of the outer side buffer area is the sector number of the buffer area disposed at the outer side of the respective zones. The end sector number represents the last sector number of the zone by the hexadecimal system. The start sector of LBA represents the start number of the logical block address (i.e., successive numbers given to other sectors than ones in the buffer and spare areas) by the decimal system. The data area number of the start sector represents the number obtained by applying offset of 31000 h (by the hexadecimal system) to the start sector number LBA, that is, by adding an offset of 200704 (by the decimal system) by the hexadecimal system.

As described above, in the embodiment according to the present invention, the spare area can be arranged in the respective zones to perform alternation process without change in the rotation number of the disk. Therefore, it is possible to shorten data access time. In a preferred embodiment having various factors shown in FIG. 10, the respective zones have 1888 tracks. In this embodiment, the rotation number of the disk is not changed and seeking 1888 tracks at maximum is merely necessary when the spare alternation process is performed.

The recording/reproducing optical disk according to the present invention has a structure described above, and consequently makes it possible to record large capacity information by land/groove recording and record and reproduce data with high precision by reliable control for tracking the land and groove.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An information recording/reproducing optical disk comprising:

a plurality of land sectors arranged along a first spiral track, each land sector comprising a first recording portion which is an area having a land shape in which information is recorded/reproduced, and a first-half header portion arranged before the first recording portion, for indicating information on an address of the information to be recorded/reproduced on/from the first recording portion; and a plurality of groove sectors arranged along a second spiral track, each groove sector comprising a second recording portion which is an area having a groove shape in which information is recorded/reproduced, and a second-half header portion arranged before the second recording portion, for indicating information on an address of the information to be-recorded/reproduced on/from the second recording portion, the second-half header portion and the first-half header portion making a pair to be arranged in a staggered pattern, the plurality of groove sectors being arranged along a second spiral track in succession to the plurality of land sectors;

wherein the land sectors are arranged along the first spiral track in succession to the plurality of groove sectors arranged along the second spiral track, thereby performing the switch between the land sector and the groove sector alternately and successively every spiral track, at the first-half header portion of the land sector arranged at the position for the switch to the groove sector among the plurality of land sectors arranged along the first spiral track, location information indicating a sector located immediately before a sector at which tracking polarity is switched is recorded together with the address information, and at the second-half header portion of the groove sector arranged at the position for the switch to the land sector among the plurality of groove sectors arranged along the second spiral track, said location information is recorded together with the address information.

2. An information recording/reproducing optical disk comprising:

a plurality of land sectors arranged along a first spiral track, each land sector comprising a first recording portion which is an area having a land shape in which information is recorded/reproduced, and a first-half header portion arranged before the first recording portion, for indicating information on an address of the information to be recorded/reproduced on/from the first recording portion; and a plurality of groove sectors arranged along a second spiral track, each groove sector comprising a second recording portion which is an area having a groove shape in which information is recorded/reproduced, and a second-half header portion arranged before the second recording portion, for indicating information on an address of the information to be recorded/reproduced on/from the second recording portion, the second-half header portion and the first-half header portion making a pair to be arranged in a staggered pattern, the plurality of groove sectors being arranged along the second spiral track in succession to the plurality of land sectors arranged along the first spiral track;

wherein the land sectors are arranged along the first spiral track in succession to the plurality of groove sectors arranged along the second spiral track, thereby performing the switch between the land sector and the groove sector alternately and successively every spiral track, at the first-half header portion of the first land sector arranged at the position for the switch to the groove sector among the plurality of land sectors arranged along the first spiral track, first location information indicating a sector located immediately before a sector at which tracking polarity is switched is recorded together with the address information, at the first-half header portion of the second land sector arranged directly before the first land sector among the plurality of land sectors arranged along the first spiral track, second location information indicating a sector located two sectors before the sector at which the tracking polarity is switched is recorded together with the address information, at the second-half header portion of the first groove sector arranged at the position for the switch to the land sector among the plurality of groove sectors arranged along the second spiral track, said first location information is recorded together with the address information, and at the second-half header portion of the second groove sector arranged directly before the first groove sector among the plurality of groove sectors arranged along the second spiral track, said second location information is recorded together with the address information.

3. An optical disk device for irradiating an optical disk with a light beam along its spiral track to record/reproduce information by optical property change, comprising:

a light radiating means for radiating the light beam onto the optical disk, a light detecting means for detecting optical property change in reflective light reflected from the optical disk by radiating the light beam with the light radiating means, and a position controlling means for controlling a position irradiated with the light beam so as to radiate the light beam onto a desired position along the spiral track on the basis of the optical property change in the reflected light detected with the light detecting means;

the optical disk comprising:

a plurality of land sectors arranged along a first spiral track, each land sector comprising a first recording portion which is an area having a land shape in which information is recorded/reproduced and which is arranged on the first spiral track, and a first-half header portion arranged before the first recording portion, for indicating information on an address of data to be recorded/reproduced on/from the first recording portion; and a plurality of groove sectors arranged along a second spiral track, each groove sector comprising a second recording portion which is an area having a groove shape in which information is recorded/reproduced and which is arranged on a second spiral track, and a second-half header portion arranged before the second recording portion, for indicating information on an address of data to be recorded/reproduced on/from the second recording portion, the second-half header portion and the first-half header portion making a pair to be arranged in a staggered pattern so that half portions of the pair of the second-half header portion and the first-half header portion are traced separately by the light beam, thereby enabling to detect the change between a land sector and a groove sector;

the plurality of the groove sectors being arranged along the second spiral track in succession to the plurality of land sectors arranged along the first spiral-track;

wherein the land sectors are arranged along the first spiral track in succession to the plurality of groove sectors arranged along the adjacent second spiral track, thereby performing the switch between the land sector and the groove sector alternately and successively every spiral track, at the first-half header portion of the land sector arranged at the position for the switch to the groove sector among the plurality of land sectors arranged along the first spiral track, location information indicating a sector located immediately before a sector at which tracking polarity is switched is recorded together with the address information, and at the second-half header portion of the groove sector arranged at the position for the switch to the land sector among the plurality of groove sectors arranged along the second spiral track, said location information is recorded together with the address information; and said location information on the first- and second-half header portions of the optical disk is reproduced to give a decision for the switch between the land sector and the groove sector, thereby performing the switch between position-control for irradiating the land sector with the light beam and position-control for irradiating the groove sector with the light beam.

4. An optical disk device for irradiating an optical disk with a light beam along its spiral track to record/reproduce data by optical property change, comprising:

a light radiating means for radiating the light beam onto the optical disk, a light detecting means for detecting optical property change in reflective light reflected from the optical disk by radiating the light beam with the light radiating means, and a position controlling means for controlling a position irradiated with the light beam so as to radiate the light beam onto a desired position along the spiral track on the basis of the optical property change in the reflected light detected with the light detecting means;

the optical disk comprising:

a plurality of land sectors arranged along a first spiral track, each land sector comprising a first recording portion which is an area having a land shape in which information is recorded/reproduced, and a first-half header portion arranged before the first recording portion, for indicating information on an address of data to be recorded/reproduced on/from the first-recording portion; and a plurality of groove sectors arranged along a second spiral track adjacent to the first spiral track, each groove sector comprising a second recording portion which is an area having a groove shape in which information is recorded/reproduced, and a second-half header portion arranged before the second recording portion, for indicating information on an address of data to be recorded/reproduced on/from the second recording portion, the second-half header portion and the first-half header portion making a pair to be arranged in a staggered pattern, the plurality of the groove sectors being arranged along the second spiral track in succession to the plural land sectors arranged along the first spiral track;

wherein the land sectors are arranged along the first spiral track in succession to the plural groove sectors arranged along the second spiral track, thereby performing the switch between the land sector and the groove sector alternately and successively every spiral track, at the first-half header portion of the first land sector arranged at the position for the switch to the groove sector among the plural land sectors arranged along the first spiral track, first location information indicating a sector located immediately before a sector at which tracking polarity is switched is recorded together with the address information, at the first-half header portion of the second land sector arranged directly before the first land sector among the plural land sectors arranged along the first spiral track, second location information indicating a sector located two sectors before the sector at which the tracking polarity is switched is recorded together with the address information, at the second-half header portion of the first groove sector arranged at the position for the switch to the land sector among the plural groove sectors arranged along the second spiral track, said first location information is recorded together with the address information, and at the second-half header portion of the second groove sector arranged directly before the first groove sector among the plural groove sectors arranged along the second spiral track, said second location information is recorded together with the address information; and said first and second location information on the first- and second-half header portions of the optical disk is reproduced to give a decision for the switch between the land sector and the groove sector, thereby performing the switch between position-control for irradiating the land sector with the light beam and position-control for irradiating the groove sector with the light beam.

5. An information recording/reproducing optical disk according to claim 2, wherein:

third location information is recorded together with address information in a first-half head portion of a third land sector, among the plurality of land sectors arranged along the first spiral track, which is located at a position immediately after a boundary between the groove sectors and the land sectors, to indicate a sector at which the tracking polarity is changed; and the third location information is recorded together with the address information in a second-half header portion of a third groove sector, among the plurality of groove sectors arranged along the second spiral track, which is located at a position immediately after a boundary between the land sectors and the groove sectors.

6. An information recording/reproducing optical disk according to claim 4, wherein:

third location information is recorded together with address information in a first-half head portion of a third land sector, among the plurality of land sectors arranged along the first spiral track, which is located at a position immediately after a boundary between the groove sectors and the land sectors, to indicate a sector at which the tracking polarity is changed;

the third location information is recorded together with the address information in a second-half header portion of a third groove sector, among the plurality of groove sectors arranged along the second spiral track, which is located at a position immediately after a boundary between the land sectors and the groove sectors; and a switching direction between the land and groove sectors is specified by reproducing one of the first, second and third location information of the first- and second-half header portions of the optical disk, thereby enabling the position controlling means to switch control of the position irradiated by the light beam between the land sector and the groove sector.

7. An information recording/reproducing optical disk according to claim 2, wherein:

address numbers are recorded in the first- and second-half header portions to indicate an address of a corresponding header portion; and values of the address numbers of a pair of first- and second-half header portions that are adjacent to each other are compared, thereby enabling a recording portion that follows the pair of header portions to be determined as to whether the recording portion is the first recording portion or the second recording portion.

8. An information recording/reproducing optical disk according to claim 7, wherein:

when the address number recorded in the first-half header portion is smaller than the address number recorded in the second-half header portion, the recording portion arranged after the pair of the header portions is the first recording portion, and when the address number recorded in the first-half header portion is larger than the address number recorded in the second-half header portion, the recording portion arranged after the pair of the header portions is the second recording portion.

* * * * *